United States Patent
Terata

(10) Patent No.: US 12,216,961 B2
(45) Date of Patent: Feb. 4, 2025

(54) TELECONFERENCE SYSTEM, COMMUNICATION TERMINAL, AND TELECONFERENCE METHOD

(71) Applicant: NEC Platforms, Ltd., Kawasaki (JP)

(72) Inventor: Mayuko Terata, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 18/266,022

(22) PCT Filed: Nov. 18, 2021

(86) PCT No.: PCT/JP2021/042429
§ 371 (c)(1),
(2) Date: Jun. 8, 2023

(87) PCT Pub. No.: WO2022/124040
PCT Pub. Date: Jun. 16, 2022

(65) Prior Publication Data
US 2024/0053952 A1  Feb. 15, 2024

(30) Foreign Application Priority Data
Dec. 11, 2020 (JP) ................. 2020-205681

(51) Int. Cl.
*G06F 3/00* (2006.01)
*G06F 3/16* (2006.01)
*H04L 65/403* (2022.01)

(52) U.S. Cl.
CPC ............ *G06F 3/165* (2013.01); *H04L 65/403* (2013.01)

(58) Field of Classification Search
None
See application file for complete search history.

(56) References Cited

U.S. PATENT DOCUMENTS 7,499,969 B1 * 3/2009 van Os ................. H04M 3/56
709/217
10,142,485 B1 * 11/2018 Haus ..................... H04M 3/568
(Continued)

FOREIGN PATENT DOCUMENTS

JP    2001-230773 A    8/2001
JP    2010-239393 A    10/2010
(Continued)

OTHER PUBLICATIONS

International Search Report for PCT Application No. PCT/JP2021/042429, mailed on Feb. 1, 2022.
(Continued)

*Primary Examiner* — Thanh T Vu
(74) *Attorney, Agent, or Firm* — Sughrue Mion, PLLC

(57) ABSTRACT

A teleconference system (1) capable of smoothly progressing a teleconference is provided. A speech determination unit (2) determines whether a voice of each of a plurality of participants in a teleconference indicates speech or backchannel. A voice output control unit (4) performs control so that the voice of each of a plurality of the participants is output by a communication terminal of each of a plurality of the participants. The voice output control unit (4) performs control, when, while one of a plurality of the participants makes speech, another participant makes speech, so as to suppress an output of the speech of the another participant. A count unit (6) counts the number of collision speeches, for each participant. A number display control unit (8) performs control so that a display related to the number of times is made at the communication terminals of a plurality of the participants.

19 Claims, 15 Drawing Sheets

(56) References Cited

U.S. PATENT DOCUMENTS

| | | | |
|---|---|---|---|
| 10,536,287 B1* | 1/2020 | Leblang | G10L 15/22 |
| 2011/0187814 A1 | 8/2011 | Nimri et al. | |
| 2011/0317825 A1 | 12/2011 | Baird et al. | |
| 2017/0351476 A1* | 12/2017 | Yoakum | G06F 3/0484 |
| 2021/0359872 A1* | 11/2021 | Deole | H04R 3/04 |
| 2022/0131979 A1* | 4/2022 | Pham | H04L 65/1089 |

FOREIGN PATENT DOCUMENTS

| | | |
|---|---|---|
| JP | 2013-183183 A | 9/2013 |
| JP | 2017-111643 A | 6/2017 |

OTHER PUBLICATIONS

Hidekazu Tamaki et al., "A Method Communicating Desire of Speaking to Avoid Speech Contention in Web Conferences", Information Processing Society of Japan, IPSJ symposium: Groupware & Network service Workshop 2011, The Eighth Workshop on Groupware and Network Services, Nov. 3, 2011, pp. 83-88.

Hidekazu Tamaki et al., "Method of Reducing Speech Contention in Distributed Conferences", Information Processing Society of Japan, IPSJ Journal vol. 53, No. 7, Jul. 15, 2012, pp. 1797-1806.

Supplementary European Search Report for EP Application No. 21903144.0, dated on Apr. 26, 2024.

* cited by examiner

PARTICIPANT INFORMATION

| IDENTIFICATION INFORMATION | PARTICIPATION STATUS | NUMBER OF COLLISIONS |
|---|---|---|
| PARTICIPANT A | SPEECH COLLISION | ONE TIME |
| PARTICIPANT B | SPEAKING | TWO TIMES |
| PARTICIPANT C | BACK-CHANNEL | ONE TIME |
| PARTICIPANT D | NO VOICE | ZERO TIMES |

Fig. 6

TELECONFERENCE SYSTEM, COMMUNICATION TERMINAL, AND TELECONFERENCE METHOD

This application is a National Stage Entry of PCT/JP2021/042429 filed on Nov. 18, 2021, which claims priority from Japanese Patent Application 2020-205681 filed on Dec. 11, 2020, the contents of all of which are incorporated herein by reference, in their entirety.

TECHNICAL FIELD

The present invention relates to teleconference system, communication terminal, teleconference method and program.

BACKGROUND ART

In recent years, it has become possible to hold a conference between two or more communication terminals placed at points remote from each other via a network. In a teleconference system to hold such a teleconference (i.e., remote conference, remote meeting), it is not necessary for conference participants to gather in a single conference room, and each participant can participate in the teleconference while staying at his or her seat or home, etc.

In relation to such technology, Patent Literature 1 discloses a communication control device that provides a realistic-sensations conference while considering the load of the communication line. Further, Patent Literature 2 discloses a conference system that is more expressive, easier to speak, and more interactive, without impairing the reproduction of existing speeches even when new speeches are made during the reproduction of existing speeches.

CITATION LIST

Patent Literature

[Patent Literature 1] Japanese Unexamined Patent Application Publication No. 2010-239393
[Patent Literature 2] Japanese Unexamined Patent Application Publication No. 2001-230773

SUMMARY OF INVENTION

Technical Problem

In a teleconference, due to communication delays, etc., it is sometimes difficult to communicate in completely real time. In addition, it is sometimes difficult to understand how other participants are doing because it is sometimes impossible to visually see the faces of other participants. In such cases, a speech collision may occur in which one participant is making a speech (utterance) while another participant is making a speech. When a speech collision occurs, the participant who has made the speech late may refrain from speaking. In this case, the dissatisfaction of the participant who has made the speech late (that is, caused the speech collision) may increase. Therefore, the occurrence of the speech collision may inhibit the smooth progress of the teleconference.

The present disclosure has been made in order to solve the aforementioned problem and an object of the present disclosure is to provide a teleconference system, a communication terminal, a teleconference method and a program capable of smoothly progressing a teleconference.

Solution to Problem

A teleconference system according to the present disclosure includes: speech determination means for determining whether a voice of each of a plurality of participants in a teleconference indicates speech or back-channel; voice output control means for performing control so that the voice of each of a plurality of the participants is output by a communication terminal of each of a plurality of the participants, and performing control, when, while one of a plurality of the participants makes speech, another participant makes speech, so as to suppress an output of the speech of the another participant; count means for counting a number of first speeches in which their outputs are suppressed, for each participant; and number display control means for performing control so that a display related to the number of times is made at the communication terminals of a plurality of the participants.

A communication terminal according to the present disclosure includes: speech determination means for determining whether a voice of a user of the communication terminal indicates speech or back-channel in a teleconference in which the user participates; voice output control means for performing control so that a voice of each of a plurality of participants in the teleconference is output by the communication terminal and the voice of the user is output by a first communication terminal which is a communication terminal of each of a plurality of the participants, and performing control, when, while one of a plurality of the participants makes speech, the user makes speech, so as to suppress an output of the speech of the user at the first communication terminal; count means for counting a number of first speeches in which their outputs are suppressed, for the user; and number display control means for performing control so that a display related to the number of times is made at the first communication terminal.

A teleconference method according to the present disclosure includes: determining whether a voice of each of a plurality of participants in a teleconference indicates speech or back-channel; performing control so that the voice of each of a plurality of the participants is output by a communication terminal of each of a plurality of the participants; performing control, when, while one of a plurality of the participants makes speech, another participant makes speech, so as to suppress an output of the speech of the another participant; counting a number of first speeches in which their outputs are suppressed, for each participant; and performing control so that a display related to the number of times is made at the communication terminals of a plurality of the participants.

A program according to the present disclosure causes a computer to achieve: a function of determining whether a voice of each of a plurality of participants in a teleconference indicates speech or back-channel; a function of performing control so that the voice of each of a plurality of the participants is output by a communication terminal of each of a plurality of the participants, and performing control, when, while one of a plurality of the participants makes speech, another participant makes speech, so as to suppress an output of the speech of the another participant; a function of counting a number of first speeches in which their outputs are suppressed, for each participant; and a function of performing control so that a display related to the number of times is made at the communication terminals of a plurality of the participants.

Advantageous Effects of Invention

According to the present disclosure, it is possible to provide a teleconference system, a communication terminal, a teleconference method and a program capable of smoothly progressing a teleconference.

BRIEF DESCRIPTION OF DRAWINGS

FIG. 6 is a diagram illustrating participant information according to the first example embodiment;

EXAMPLE EMBODIMENT

Outline of Example Embodiments According to the Present Disclosure

Figure 1:
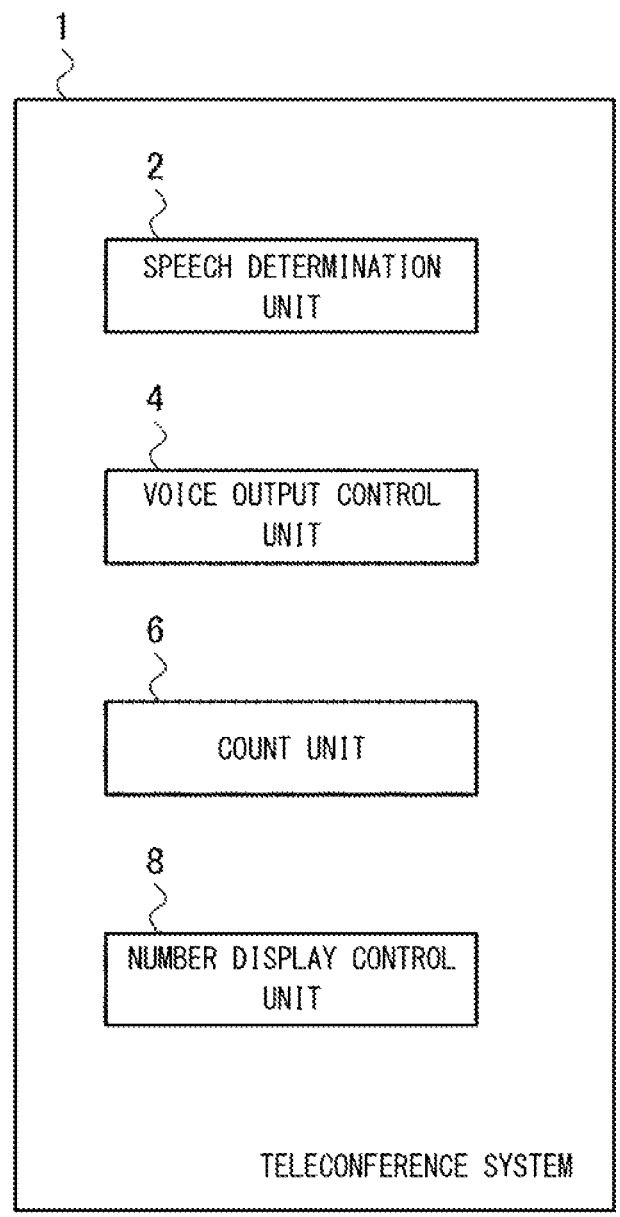
FIG. 1 a diagram showing a teleconference system according to an example embodiment of the present disclosure.

Prior to giving the description of example embodiments of the present disclosure, an outline of the example embodiments according to the present disclosure will be described. FIG. 1 a diagram showing a teleconference system 1 according to an example embodiment of the present disclosure. The teleconference system 1 realizes a teleconference (Web conference). The teleconference is conducted using communication terminals of a plurality of participants. The teleconference system 1 can be realized by, for example, a computer. The teleconference system 1 may be realized by each communication terminal of the participant in the teleconference or by a server or the like that manages the teleconference. The teleconference system 1 may also be realized by multiple apparatuses such as a server and a communication terminal.

The teleconference system 1 has a speech determination unit 2, a voice output control unit 4, a count unit 6, and a number display control unit 8. The speech determination unit 2 includes a function as speech determination means. The voice output control unit 4 includes a function as voice output control means. The count unit 6 includes a function as count means. The number display control unit 8 includes a function as number display control means.

Figure 2:
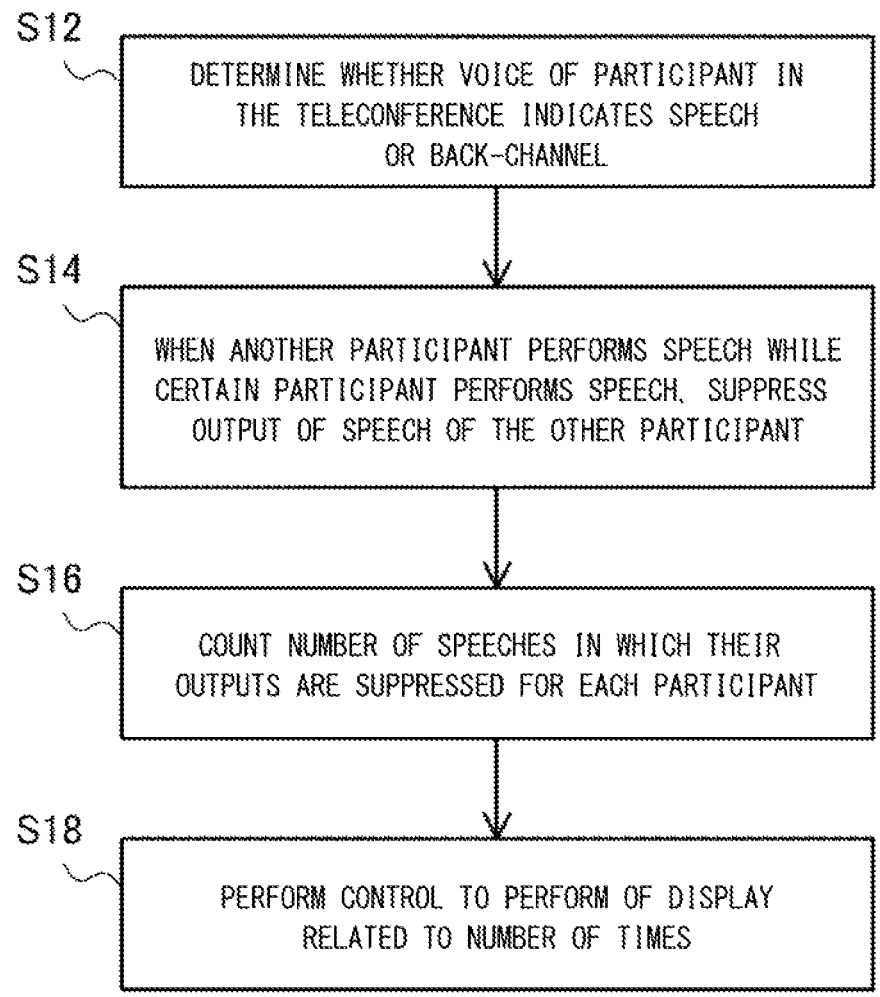
FIG. 2 is a flowchart showing a teleconference method executed by the teleconference system according to the example embodiment of the present disclosure.

FIG. 2 is a flowchart showing a teleconference method executed by the teleconference system 1 according to the example embodiment of the present disclosure. The speech determination unit 2 determines whether the voice of each of a plurality of the participants in the teleconference indicates speech or back-channel (Step S12). The determination method will be described in the following example embodiment. Here, "speech" is a voice (vocalization) corresponding to a word (language) of meaningful content. On the other hand, "back-channel" (i.e., supportive response, meaningless utterance, chiming-in, back-channeling, back-channel feedback or back-chatting) is a voice (vocalization) corresponding to a word that have no meaning in itself. In this specification, "speech" and "back-channel" are regarded as opposite terms to each other.

The voice output control unit 4 performs control so that the voice of each of a plurality of the participants is output by the communication terminal of each of a plurality of the participants. When, while one of a plurality of the participants makes the speech, another participant makes the speech, the voice output control unit 4 performs control so as to suppress the output of the speech of the other participant (Step S14). That is, when a speech collision occurs, the voice output control unit 4 suppresses the output of the speech of the other participant (collision speech). Hereafter, the later speech (speech that caused the speech collision) is sometimes referred to as the "collision speech." Therefore, the collision speech is the speech whose output is suppressed. The suppression of the output of the collision speech is, for example, that the collision speech is not output by the communication terminal of each participant, but it is not limited to this.

In this example embodiment, the term "speech collision" means that, while one participant makes the speech, another participant makes the speech, not that the speeches of a plurality of participants are simultaneously output by each communication terminal. Note that, in this example embodiment, the output of the later speech among the speeches of a plurality of participants can be suppressed. Therefore, in this example embodiment, the occurrence of a "speech collision" may be recognized by the participant who makes the collision speech but not by the other participants. That is, since the participant who makes the collision speech has made the speech while the speech of another participant was output by his or her own communication terminal, he or she can recognize the occurrence of the speech collision. On the other hand, since the output of the collision speech is suppressed in each communication terminal, the participants other than the participant who has made the collision speech may not recognize that the speech collision has occurred.

The count unit 6 counts the number of speeches in which their outputs are suppressed (collision speech; first speech), for each participant (Step S16). The number display control unit 8 performs control so that the display related to number of times is made at the communication terminals of a plurality of the participants (Step S18). Accordingly, each participant can know which participant makes many speech collisions and so on.

Here, it can be said that the participant with many collision speeches (who has made many speech collisions) is the one who wants to make the speech. Therefore, by causing the communication terminal of the teleconference participant to display that the number of collision speeches is many, the other participant can recognize that the participant wants to make the speech. Accordingly, the other participant can perform an act, such as encouraging the participant to make speech or waiting for the participant to make speech. Therefore, dissatisfaction of the participant, such as not being able to make the speech even if he or she want to, can be reduced. Therefore, the teleconference system 1 according to the present example embodiment can smoothly progress the teleconference.

First Example Embodiment

Hereinafter, with reference to the drawings, example embodiments will be described. In order to clarify the explanation, the following descriptions and the drawings are omitted and simplified as appropriate. Further, throughout the drawings, the same components are denoted by the same reference symbols and overlapping descriptions are omitted as necessary.

Figure 3:
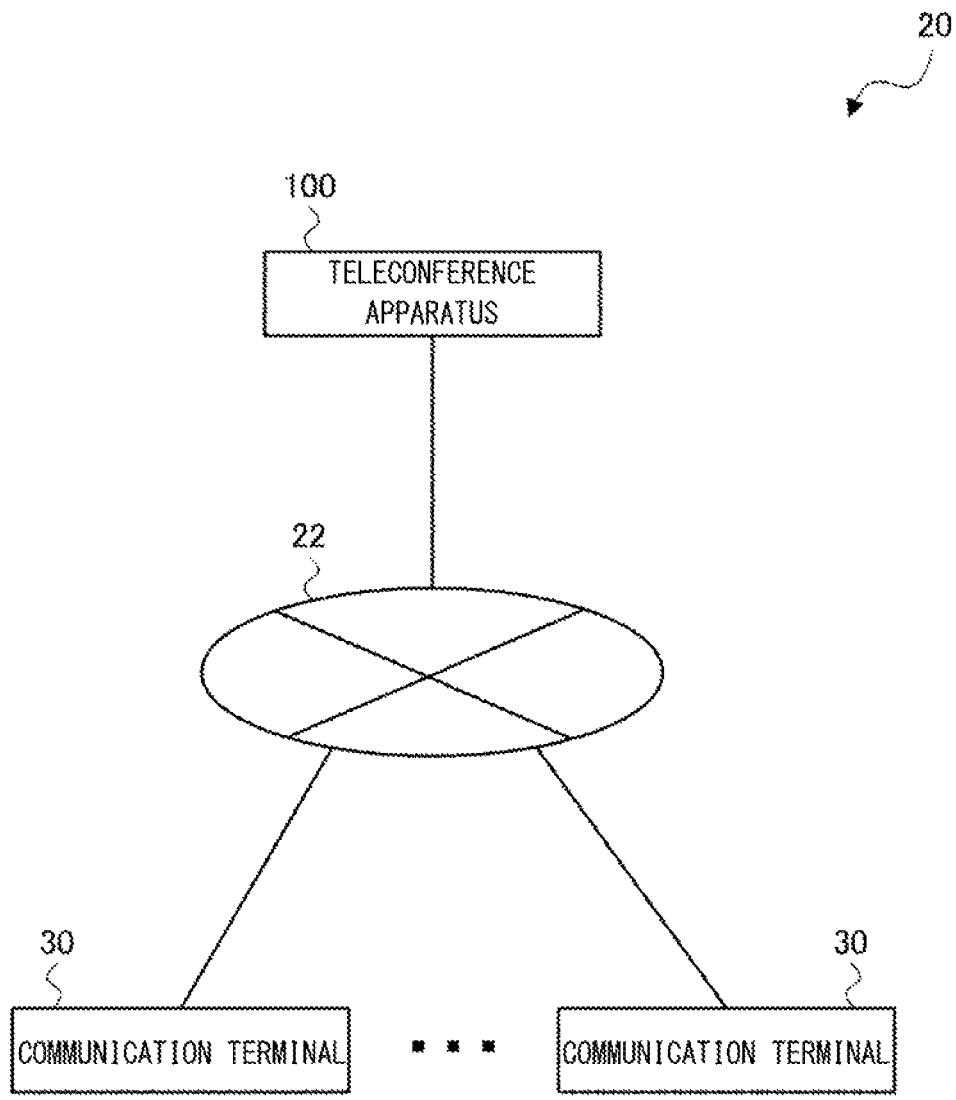
FIG. 3 is a diagram showing a teleconference system according to a first example embodiment.

FIG. 3 is a diagram showing a teleconference system 20 according to the first example embodiment. The teleconference system 20 includes a plurality of communication terminals 30 and a teleconference apparatus 100. The communication terminal 30 can be provided for each participant in the teleconference. A plurality of the communication terminals 30 and the teleconference apparatus 100 are connected to one another via a network 22 so that they can communicate with one another. The network 22 may be wired, wireless or a combination of wired and wireless. The network 22 may be the Internet or a local area network (LAN).

The communication terminal 30 is, for example, a computer owned by the participant. The communication terminal 30 is, for example, a personal computer (PC) or a mobile terminal such as a smartphone or a tablet terminal. When the participant participates in a teleconference, the communication terminal transmits voice data indicating the voice (speech or back-channel) made by the participant to the teleconference apparatus 100 via the network 22. The communication terminal 30 receives voice data indicating the voice (speech or back-channel) of another participant from the teleconference apparatus 100 via the network 22. The communication terminal 30 outputs the voice corresponding to the voice data so that the participant who is the user of the communication terminal 30 can hear it.

The teleconference apparatus 100 is, for example, a computer such as a server. The teleconference apparatus 100 manages the teleconference. The teleconference apparatus 100 receives voice data from the communication terminal 30 of each participant and transmits it to a plurality of the communication terminals 30. In this case, the teleconference apparatus 100 does not need to transmit the voice data to the communication terminal 30 that has transmitted the voice data (the same applies to other example embodiments). Note that in the first example embodiment, the term "voice" can also mean "voice data indicating the voice" as a processing object in information processing.

Figure 4:
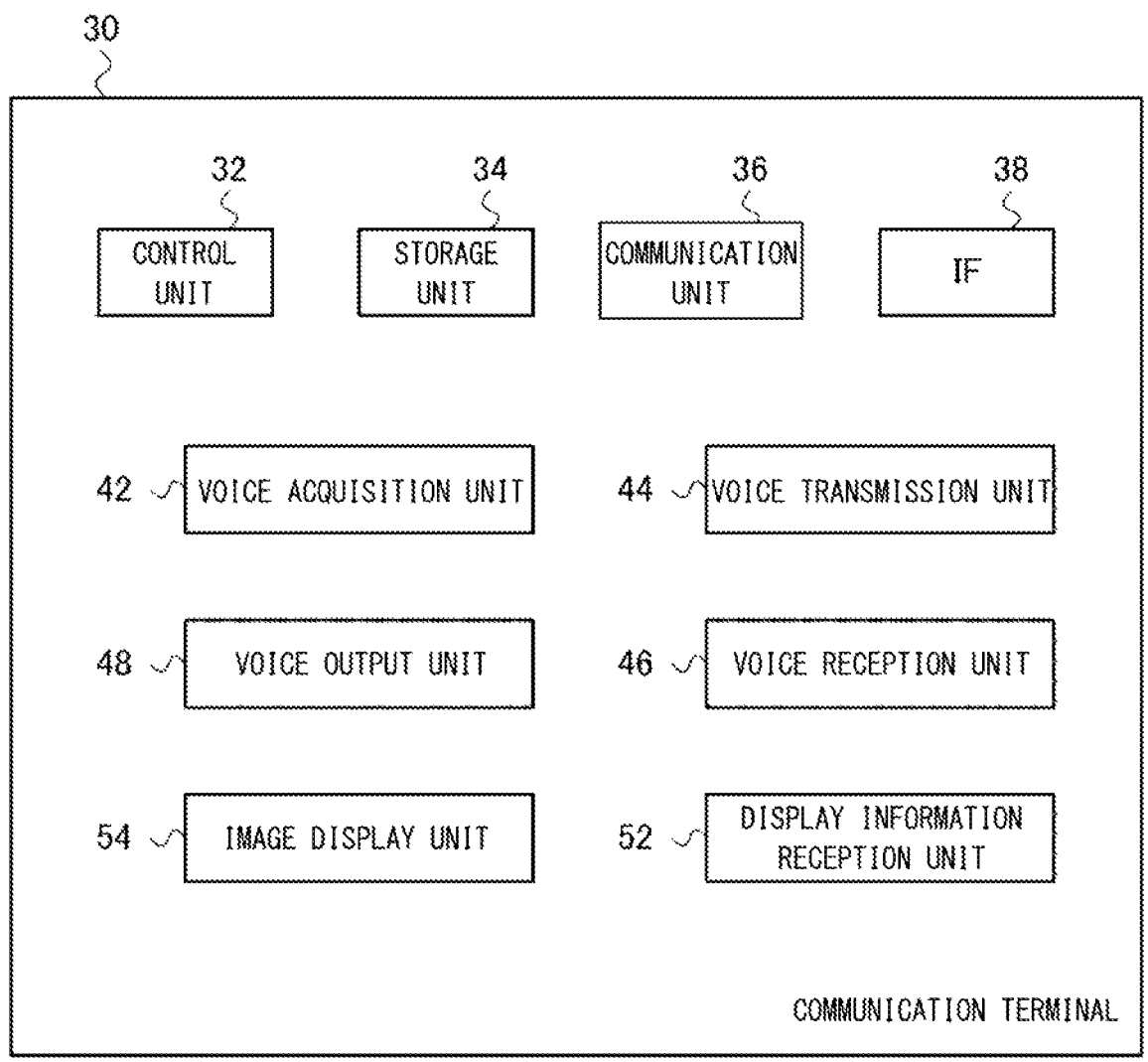
FIG. 4 is a diagram showing a configuration of a communication terminal according to the first example embodiment.

FIG. 4 is a diagram showing a configuration of the communication terminal according to the first example embodiment. The communication terminal 30 includes, as main hardware configurations, a control unit 32, a storage unit 34, a communication unit 36, and an interface unit (IF) 38. The control unit 32, the storage unit 34, the communication unit 36, and the interface unit 38 are connected to one another via a data bus or the like.

The control unit 32 is, for example, a processor such as a Central Processing Unit (CPU). The control unit 32 has a function as an arithmetic apparatus that performs, for example, control processing and arithmetic processing. The storage unit 34 is, for example, a storage device such as a memory or a hard disc. The storage unit 34 is, for example, a Read Only Memory (ROM) or a Random Access Memory (RAM). The storage unit 34 has a function for storing, for example, a control program(s) and an arithmetic program(s) executed by the control unit 32. Further, the storage unit 34 has a function for temporarily storing processing data and the like. The storage unit 34 may include a database.

The communication unit 36 performs processing necessary for communicating with the apparatuses constituting the teleconference system 20, such as the teleconference apparatus 100. The communication unit 36 may include, for example, a communication port, a router, and a firewall. The interface unit 108 is, for example, a user interface (UI). The interface unit 108 includes an input device such as a keyboard, a touch panel, or a mouse, and an output device such as a display or a speaker. The interface unit 108 receives an operation of inputting data performed by a user (operator) and outputs information to the user. The interface unit 108 may include, as input devices, a sound collector such as a microphone and an imaging device such as a camera. Further, at least a part of the interface unit 108 need not be physically integrated with the communication terminal 30. At least a part of the interface unit 108 may be connected to the communication terminal 30 by wire or wireless.

The communication terminal 30 includes, as components, a voice acquisition unit 42, a voice transmission unit 44, a voice reception unit 46, a voice output unit 48, a display information reception unit 52, and an image display unit 54. The voice acquisition unit 42, the voice transmission unit 44, the voice reception unit 46, the voice output unit 48, the display information reception unit 52, and the image display unit 54 may be implemented by the aforementioned hardware configuration or by software.

The voice acquisition unit 42 acquires the voice made by the user of the communication terminal 30 who is a teleconference participant. The voice acquisition unit 42 may acquire the voice by the sound collector that is the interface unit 38. The voice transmission unit 44 transmits the acquired voice (voice data) of user to the teleconference apparatus 100 via the network 22. The voice transmission unit 44 may transmit the voice (voice data) via the communication unit 36.

The voice reception unit 46 receives the voice (voice data) of each of a plurality of the participants of the teleconference from the teleconference apparatus 100 via the network 22. The voice reception unit 46 may receive the voice (voice data) by the communication unit 36. The voice output unit 48 outputs the voices of a plurality of the participants so that the user of the communication terminal 30 can hear them. The voice output unit 48 may output the voices by the speaker that is the interface unit 38.

The display information reception unit 52 receives the display information from the teleconference apparatus 100 via the network 22. Here, the display information is information indicating the information displayed by the interface unit 38 of the communication terminal 30. The display information will be described later. The display information reception unit 52 may receive the display information by the communication unit 36. The image display unit 54 displays the image corresponding to the received display information. The image display unit 54 may display the image by the display that is the interface unit 38.

Figure 5:
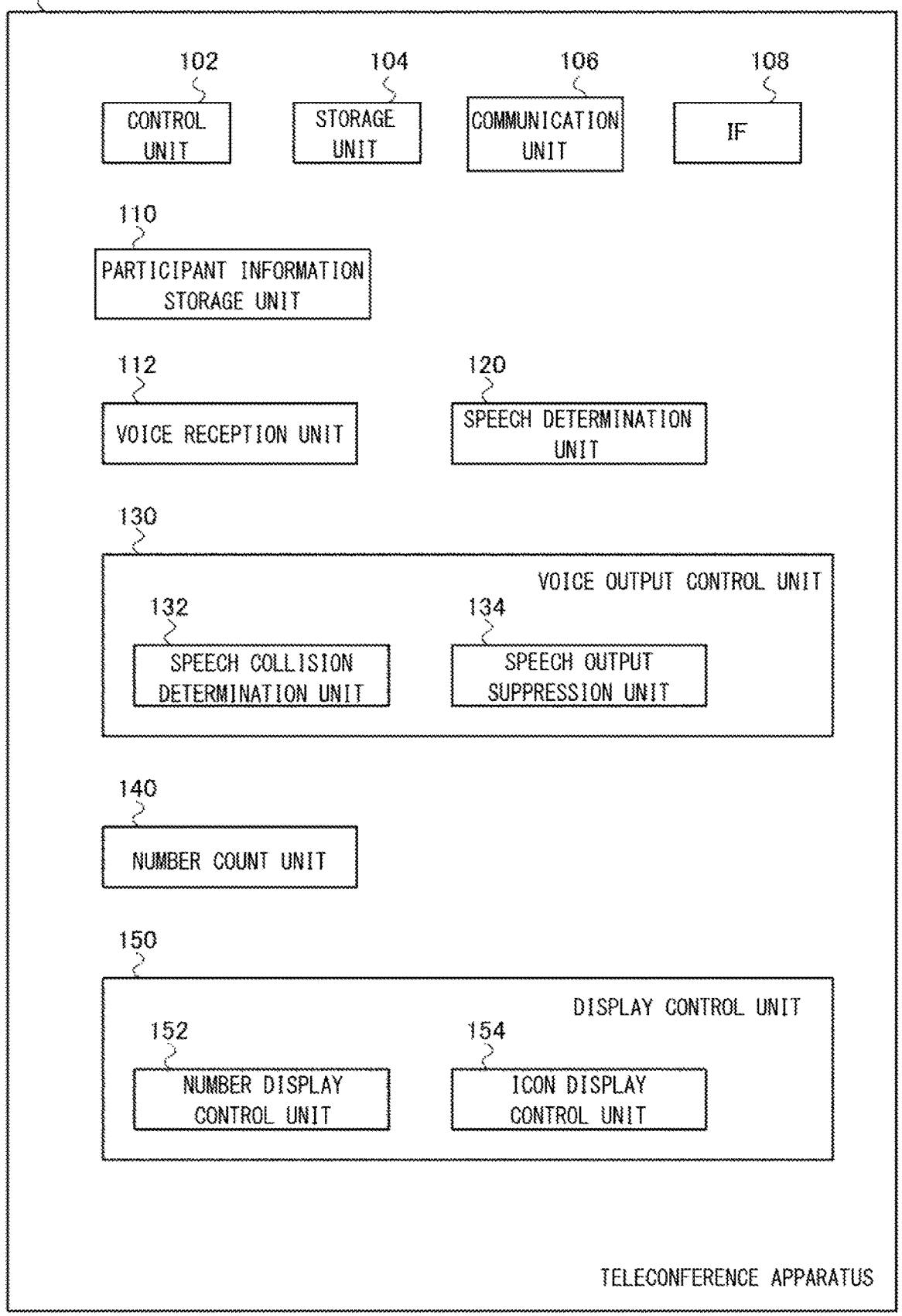
FIG. 5 is a diagram showing a configuration of a teleconference apparatus according to the first example embodiment.

FIG. 5 is a diagram showing a configuration of the teleconference apparatus 100 according to the first example embodiment. The teleconference apparatus 100 includes, as main hardware configurations, a control unit 102, a storage unit 104, a communication unit 106, and an interface unit 108. The control unit 102, the storage unit 104, the communication unit 106, and the interface unit 108 are connected to one another via a data bus or the like.

The control unit 102 is a processor such as a CPU, for example. The control unit 102 has a function as an arithmetic apparatus that performs, for example, analysis processing, control processing and arithmetic processing. The storage unit 104 is, for example, a storage device such as a memory or a hard disc. The storage unit 104 is, for example, a ROM or RAM. The storage unit 104 has a function for storing, for example, a control program(s) and an arithmetic program(s) executed by the control unit 102. Further, the storage unit 104 has a function for temporarily storing processing data and the like. The storage unit 104 may include a database.

The communication unit 106 performs processing necessary for communicating with other apparatuses such as communication terminals 30 via the network 22. The communication unit 106 may include, for example, a communication port, a router, and a firewall. The interface unit (IF) 108 is, for example, a user interface (UI). The interface unit 108 includes an input device such as a keyboard, a touch panel, or a mouse, and an output device such as a display or a speaker. The interface unit 108 receives an operation of inputting data performed by an operator and outputs information to the operator.

The teleconference apparatus 100 according to the first example embodiment includes, as components, a participant information storage unit 110, a voice reception unit 112, a speech determination unit 120, a voice output control unit 130, a number count unit 140, and a display control unit 150. The voice output control unit 130 includes a speech collision determination unit 132 and a speech output suppression unit 134. The display control unit 150 includes a number display control unit 152 and an icon display control unit 154. The teleconference apparatus 100 need not be physically composed of one device. In this case, each of the aforementioned components may be implemented by a plurality of physically-separated devices.

The participant information storage unit 110 includes a function as participant information storage means. The voice reception unit 112 includes a function as voice reception means. The speech determination unit 120 corresponds to the speech determination unit 2 shown in FIG. 1. The speech determination unit 120 includes a function as speech determination means. The voice output control unit 130 corresponds to the voice output control unit 4 shown in FIG. 1. The voice output control unit 130 includes a function as voice output control means. The number count unit 140 corresponds to the count unit 6 shown in FIG. 1. The number count unit 140 includes a function as number count means. The display control unit 150 includes a function as display control means.

The speech collision determination unit 132 includes a function as speech collision determination means. The speech output suppression unit 134 includes a function as speech output suppression means. The number display control unit 152 corresponds to the number display control unit 8 shown in FIG. 1. The number display control unit 152 includes a function as number display control means. The icon display control unit 154 includes a function as icon display control means.

Note that each of the aforementioned components may be implemented, for example, by executing a program under the control of the control unit 102. More specifically, each of the components may be implemented by the control unit 102 executing a program stored in the storage unit 104. Further, each of the components may be implemented by installing a necessary program stored in any nonvolatile recording medium as required. Further, each of the components is not necessarily implemented by software executed by a program, and may instead be implemented, for example, by any combination of hardware, firmware, and software. Further, each of the components may also be implemented using a user-programmable integrated circuit, such as a field-programmable gate array (FPGA) or a microcomputer. In this case, a program composed of each of the aforementioned components may be implemented by using this integrated circuit. The same is applicable to other example embodiments that will be described later.

The participant information storage unit 110 stores participant information, which is information about participants in the teleconference.

FIG. 6 is a diagram illustrating participant information according to the first example embodiment. FIG. 6 illustrates participant information corresponding to a teleconference in which four participants A-D participate. The participant information includes identification information for each participant, the participation status of each participant, and the number of collisions for each participant.

Here, "participation status" indicates how each participant currently participates in a teleconference. The participation status is determined by the speech determination unit 120 and the speech collision determination unit 132, which will be described later. In the example in FIG. 6, participant A makes a speech while participant B makes a speech. In other words, participant A caused a speech collision. Therefore, the participation status of participant A is "speech collision" and the participation status of participant B is "speaking". In addition, participant C makes back-channel and participant D is not speaking. Therefore, the participation status of participant C is "back-channel" and the participation status of participant D is "no voice".

Further, "number of collisions" indicates the number of times each participant has caused a speech collision, that is, the number of collision speeches of each participant. The number of collisions is counted by the number count unit 140, which will be described later. In the example of FIG. 6, the number of collisions of participant A is one time. As described above, because participant A has caused the speech collision, the number of collisions is updated from zero to one. In addition, the number of collisions of participant B is two times, the number of collisions of participant C is one time, and the number of collisions of participant D is zero times.

The voice reception unit 112 receives, from each communication terminal 30, the voice (voice data) of a participant who is a user of each communication terminal 30 via a network 22. The voice reception unit 112 receives the voice (voice data) of the participant transmitted by the voice transmission unit 44 of the communication terminal 30, by the communication unit 106. Accordingly, the voices of participants A-D are received.

The speech determination unit 120 analyzes the voice received by the speech reception unit 112 and performs voice recognition processing, for each of a plurality of the participants. Then, the speech determination unit 120 determines whether the voice of each participant indicates speech or back-channel. That is, the speech determination unit 120 determines whether each participant is speaking (making speech or back-channel).

Specifically, the speech determination unit 120 analyzes words included in the voice by performing processing such as acoustic analysis and natural language processing. Then, the speech determination unit 120 determines whether or not meaningful words (subject, predicate, object, and the like) are included in the voice. In other words, the speech determination unit 120 determines whether or not words other than meaningless words (interjection and the like) are included in the voice. If meaningful words are included in the voice, the speech determination unit 120 determines that the voice is "speech". On the other hand, when only meaningless words (interjections and the like) are included in the voice, the speech determination unit 120 determines that the voice is "back-channel". The speech determination unit 120 may determine whether or not the received voice includes a human voice. If the voice does not include a human voice, the speech determination unit 120 may not determine whether the voice is speech or back-channel as described above, assuming that the voice is a background sound.

The voice output control unit 130 performs control so that the voice of each of a plurality of the participants is output by the communication terminal 30 of each of a plurality of the participants. Specifically, the voice output control unit 130 transmits the received voice (voice data) to the communication terminal of each of a plurality of the participants via the network 22 by the communication unit 106. Thus, the voice is output by the voice output unit 48 of each communication terminal 30. Therefore, participants A-D can hear the voice of the other participants. Moreover, the voice output control unit 130 may perform mixing processing so that the voices of a plurality of the participants are not interrupted when the voices of a plurality of the participants are simultaneously emitted. However, in this example embodiment, as described later, when a speech collision occurs, the output of the voice which causes the speech collision is suppressed. On the other hand, when the voice corresponds to the back-channel, the voice output control unit 130 transmits the voice to the communication terminals 30 of each of a plurality of the participants. Accordingly, the back-channel of the participant is output by the voice output unit 48 of each communication terminal 30.

The speech collision determination unit 132 determines whether or not the speech collision has occurred, for each of a plurality of the participants. Specifically, when the speech determination unit 120 determines that one participant is making speech, the speech collision determination unit 132 determines whether or not another participant has started speaking during the period from the start of the participant's speech to the end of the speech. When another participant has started speaking during the period in which one participant is making speech, the speech collision determination unit 132 determines that another participant (i.e., a participant who made speech later) has caused the speech collision.

The speech of another participant who has caused the speech collision is called collision speech. In the example of FIG. 6, because participant A has started speaking during the period in which participant B is making speech, the speech collision determination unit 132 determines that participant A has caused the speech collision and determines that the speech of participant A is a collision speech.

The speech output suppression unit 134 performs control to suppress the output of the collision speech. Specifically, the speech output suppression unit 134 performs control so as not to transmit the collision speech (voice data) to the communication terminals 30 of a plurality of the participants. As a result, since each communication terminal 30 does not receive the collision speech (voice data), the collision speech is not output by the communication terminal 30. Therefore, in the example of FIG. 6, in each communication terminal 30, the speech of participant A (collision speech) does not interfere with the hearing of the speech of participant B. Alternatively, the speech output suppression unit 134 may perform control so that the collision speech is output at a low volume by each communication terminal 30. For example, the speech output suppression unit 134 may process the voice data of the collision speech so that the volume of the collision speech is reduced to the extent that it does not interfere with the hearing of the previous speech (the speech of participant B in the example of FIG. 6) that has been subjected to the speech collision. Then, the voice output control unit 130 may transmit the processed voice data to each communication terminal 30. Thus, in the example of FIG. 6, each communication terminal 30 outputs the speech of participant A at an extremely low volume that does not interfere with the hearing of the speech of participant B.

The number count unit 140 counts the number of times the speech collision has occurred for each of a plurality of the participants. In other words, the number count unit 140 counts the number of collision speeches for each of a plurality of the participants (communication terminals 30). Accordingly, the number of collisions illustrated in FIG. 6 is counted.

The display control unit 150 controls what kind of image is displayed in each communication terminal 30 for each of a plurality of the participants. Specifically, the display control unit 150 generates display information indicating the image to be displayed in each communication terminal 30. The display control unit 150 then transmits the generated display information to each communication terminal 30. Further, the display control unit 150 may generate display information according to the participant information stored in the participant information storage unit 110. Note that the display control unit 150 may transmit, to the communication terminal 30 of the participant who caused the speech collision, display information for displaying a message indicating that another participant is speaking. Further, the display control unit 150 may generate display information including the participant information and an instruction indicating that display is performed according to the participant information. In this case, the communication terminal 30 generates an image displayed by the interface unit 28 of the communication terminal 30, according to the display information.

The number display control unit 152 performs control so that the number of collision speeches for each of a plurality of the participants is displayed at each communication terminal 30. Specifically, the number display control unit 152 generates display information indicating how many number of collisions each participant has. Then, the number of collisions of each participant is displayed by a plurality of the communication terminals 30 when the display control unit 150 transmits the display information to a plurality of the communication terminals 30. In the example of FIG. 6, it is displayed that the number of collisions of participant A is one time, the number of collisions of participant B is two times, the number of collisions of participant C is one time, and the number of collisions of participant D is zero times, in each communication terminal 30 of participants A-D. Accordingly, each participant can understand the number of collisions of all participants. Thus, each participant can grasp which participant wants to speak.

The number display control unit 152 may display the number of collisions greater than a predetermined threshold in a display form that is more conspicuous than the display of the number of collisions equal to or less than this threshold. That is, when the number of collisions of a certain participant is greater than a predetermined threshold, the number of collisions display control unit 152 may display the number of collisions in a display form that is more conspicuous than the display of the number of collisions of other participants. The number of collisions display control unit 152 generates display information including instructions for displaying the number of collisions in the display form. For example, the number display control unit 152 may display the number of collisions below the threshold in black and the number of collisions exceeding the threshold in red. Accordingly, each participant can more reliably identify which participant wants to speak.

Further, the number display control unit 152 may cause each communication terminal 30 to display the greatest number of collisions among the number of collisions of a plurality of the participants in a display form that is more conspicuous than the display of the other number of collisions. The number display control unit 152 generates display information including instructions for displaying the number of collisions in the display form. For example, the number display control unit 152 may cause the greatest number of collisions to be displayed in red and cause the other number of collisions to be displayed in black. Accordingly, each participant can more reliably identify which participant's number of collisions is greater than that of the other participants. Thus, it is possible to more reliably identify which participant is relatively more eager to speak.

Further, the number display control unit 152 may cause each communication terminal 30 to display the number of collisions that is conspicuously greater than the other number of collisions in a display form that is more conspicuous than the display of the other number of collisions. For example, the number display control unit 152 subtracts, from the number of collisions of the first participant among a plurality of the participants, the number of collisions of each of the other participants. Then, when all the values obtained by subtraction are greater than a predetermined threshold, the number display control unit 152 may cause the number of collisions of the first participant to be displayed in a display form that is more conspicuous than the display of the number of collisions of the other participants. The number display control unit 152 generates display information including instructions for displaying the number of collisions in the display form. For example, the number display control unit 152 may cause the number of collisions of the first participant to be displayed in red and cause the number of collisions of the other participants to be displayed in black. Accordingly, each participant can more reliably identify which participant's number of collisions is conspicuously greater than that of the other participants. Thus, it is possible to much more reliably identify which participant is relatively more eager to speak.

The icon display control unit 154 performs control so that the face icons corresponding to a plurality of the participants respectively are displayed on the communication terminal 30 of each of a plurality of the participants. The icon display control unit 154 generates display information including instructions to display the face icons. In the example of FIG. 6, four face icons corresponding to participants A-D are displayed on the communication terminal 30.

Here, the icon display control unit 154 may generate display information so that each face icon moves (i.e., acts, operate or is activated) depending on the participation status of the corresponding participant. Specifically, the icon display control unit 154 may display the face icon so that the face icon of the participant who has made the collision speech is not moved. On the other hand, the icon display control unit 154 may display the face icon so that the face icon of the participant who has made the speech other than the collision speech is moved. Further, the icon display control unit 154 may display the face icon so that the face icon of the participant who has made back-channel is moved.

For example, the icon display control unit 154 may display the face icon so that the mouth of the face icon of the participant who has not made vocalization (speech or back-channel) (participant D in the example of FIG. 6) is closed. Moreover, the icon display control unit 154 may display the face icon so that the mouth of the face icon of the participant who has made speech other than the collision speech (participant B in the example of FIG. 6) is opened. Alternatively, the icon display control unit 154 may display the face icon so that the mouth of the face icon of the participant who has made speech other than the collision speech is opened and closed. Further, the icon display control unit 154 may display the face icon so that the mouth of the face icon of the participant who has made back-channel (participant C in the example of FIG. 6) is opened. Alternatively, the icon display control unit 154 may display the face icon so that the mouth of the face icon of the participant who has made back-channel is opened and closed. On the other hand, the icon display control unit 154 may display the face icon so that the mouth of the face icon of the participant who has made the collision speech (participant A in the example of FIG. 6) remains closed.

Accordingly, each participant can see the face icon displayed on each communication terminal 30 and can know which participant is speaking. Further, each participant can know that the participant who has made back-channel has made the back-channel even if the communication terminal 30 of the participant who has made the back-channel is set to mute. Moreover, since the face icon of the participant who has caused the speech collision does not move, each participant can avoid receiving the annoyance caused by the speech collision.

Figure 7:
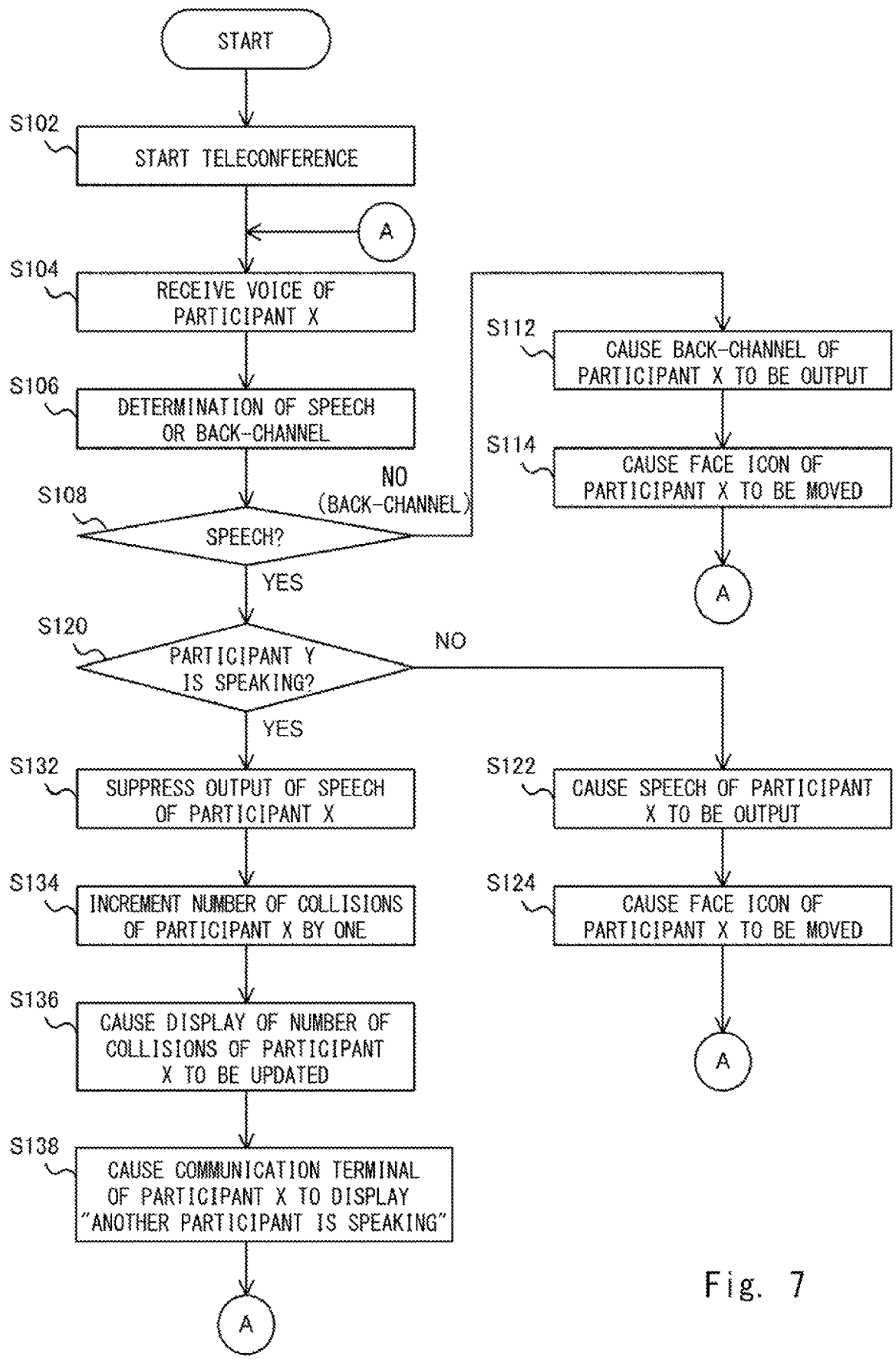
FIG. 7 is a flowchart showing a teleconference method executed by the teleconference system according to the first example embodiment.

FIG. 7 is a flowchart showing a teleconference method executed by the teleconference system 20 according to the first example embodiment. The processing shown in FIG. 7 is mainly executed by the teleconference apparatus 100. The teleconference apparatus 100 starts the teleconference (Step S102). At this time, the display information generated by the display control unit 150 indicates that the mouth of the face icon is closed (the face icon is not moving) and that the number of collisions is zero times, for all participants.

Next, the voice reception unit 112 receives the voice of participant X (Step S104). Here, when participants A-D participate in the teleconference as shown in FIG. 6, participant X (and participant Y, which will be described later) is one of participants A-D. Then, the speech determination unit 120 determines whether the voice of participant X indicates speech or back-channel, as described above (Step S106). When the voice of participant X does not indicate speech (i.e., indicates back-channel) (NO in Step S108), the voice output control unit 130 performs control so that the back-channel of participant X is output at each communication terminal 30 (Step S112). Further, the display control unit 150 (the icon display control unit 154) performs control so that the face icon of participant X is displayed by each communication terminal 30 so that it moves (Step S114).

On the other hand, when the voice of participant X indicates speech (YES in S108), the speech collision determination unit 132 determines whether participant Y, which is different from participant X, is already speaking (Step S120). When participant Y is not speaking (NO in S120), no speech collision occurs because no one else makes speech when participant X makes speech. Therefore, the voice output control unit 130 performs control so that the speech of participant X is output by each communication terminal 30 (Step S122). Moreover, the display control unit 150 (the icon display control unit 154) performs control so that the face icon of participant X is displayed by each communication terminal 30 so that it moves (Step S124). At this time, the display control unit 150 may perform control so that a message indicating that participant X is speaking is displayed by each communication terminal 30.

On the other hand, when participant Y is speaking (YES in S120), a speech collision occurs due to the speech of participant X. Therefore, the voice output control unit 130 (the speech output suppression unit 134) performs control so as to suppress the output of the speech of participant X (Step S132). Moreover, the number count unit 140 increments the number of collisions of participant X by one (Step S134). Accordingly, the number of collisions of participant X, in the participant information stored in the participant information storage unit 110, is updated. The display control unit 150 (the number display control unit 152) performs control so that the display of the number of collisions of participant X is updated (Step S136). The display control unit 150 performs control so that the communication terminal 30 of participant X displays that "another participant is speaking" (Step S138).

Second Example Embodiment

Next, a second example embodiment will be described with reference to the drawings. In order to clarify the explanation, the following descriptions and the drawings are omitted and simplified as appropriate. Further, throughout the drawings, the same components are denoted by the same reference symbols and overlapping descriptions are omitted as necessary. The second example embodiment differs from the first example embodiment in that the functions of the teleconference apparatus 100 according to the first example embodiment can be implemented in each communication terminal.

Figure 8:
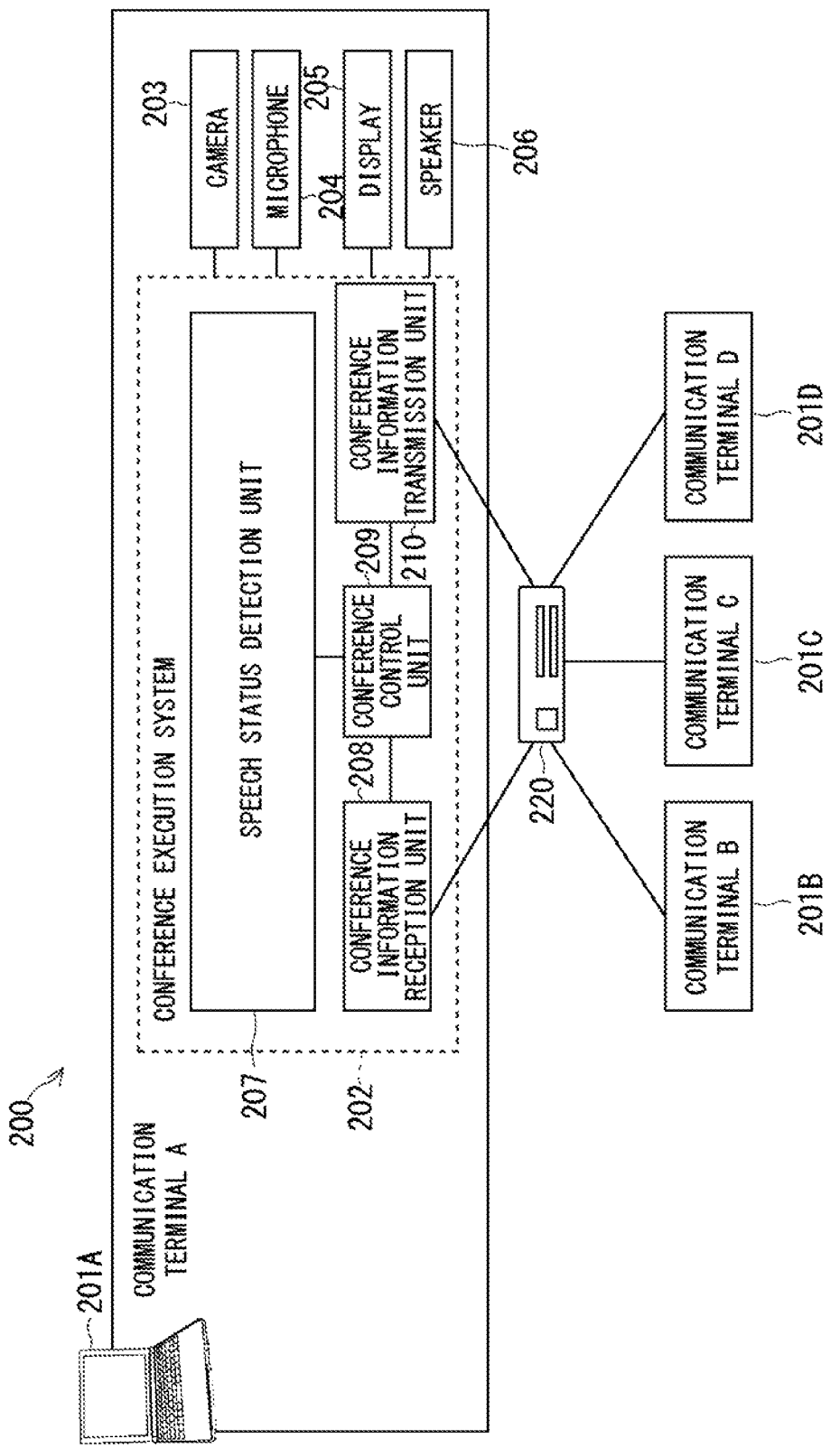
FIG. 8 is a diagram showing a teleconference system according to a second example embodiment.

FIG. 8 is a diagram showing a teleconference system 200 according to the second example embodiment. The teleconference system 200 includes a plurality of communication terminals 201A to 201D and a conference server 220. The communication terminals 201A to 201D are connected to a network such as the Internet. The communication terminals 201A to 201D and the conference server 220 are connected to one another via a network so that they can communicate with one another. Although four communication terminals 201 are shown in FIG. 8, the number of communication terminals 201 can be any number of two or more.

Each of a plurality of the communication terminals 201A to 201D includes a conference execution system 202, a camera 203, a microphone 204, a display 205, and a speaker 206. The conference execution system 202 functions to execute a teleconference. The camera 203 can shoot (i.e., photograph) a figure (face, etc.) of a user of the communication terminal 201. The microphone 204 can collect the voice of the user of the communication terminal 201. The display 205 can display images about the teleconference. The speaker 206 can output voice of participants in the teleconference (i.e., users of communication terminals 201A to 201D).

The conference execution system 202 includes, as components, a speech status detection unit 207, a conference information reception unit 208, a conference control unit 209, and a conference information transmission unit 210. Each communication terminal 201 may include the hardware configurations of the communication terminal 30 according to the above-described first example embodiment. A description of each component of the communication terminal 201 will be described later.

The communication terminal 201 transmits voice information indicating the voice of the user of the communication terminal 201 to the conference server 220. The communication terminal 201 detects the speech status of the user and transmits speech status information indicating the detected speech status to the conference server 220. Here, the "speech status" indicates whether each participant is making speech or back-channel. The speech status may indicate that the participant is silent.

Upon receiving the voice information and the speech status information from each communication terminal 201, the conference server 220 performs mixing processing on the voice information of each user (teleconference participant). The conference server 220 then transmits the voice information to which the mixing process has been applied and the speech status information to a plurality of the communication terminals 201. By transmitting the voice information to which the mixing process has been applied, the voice can be stably output from the speaker 206 at each communication terminal 201.

Figure 9:
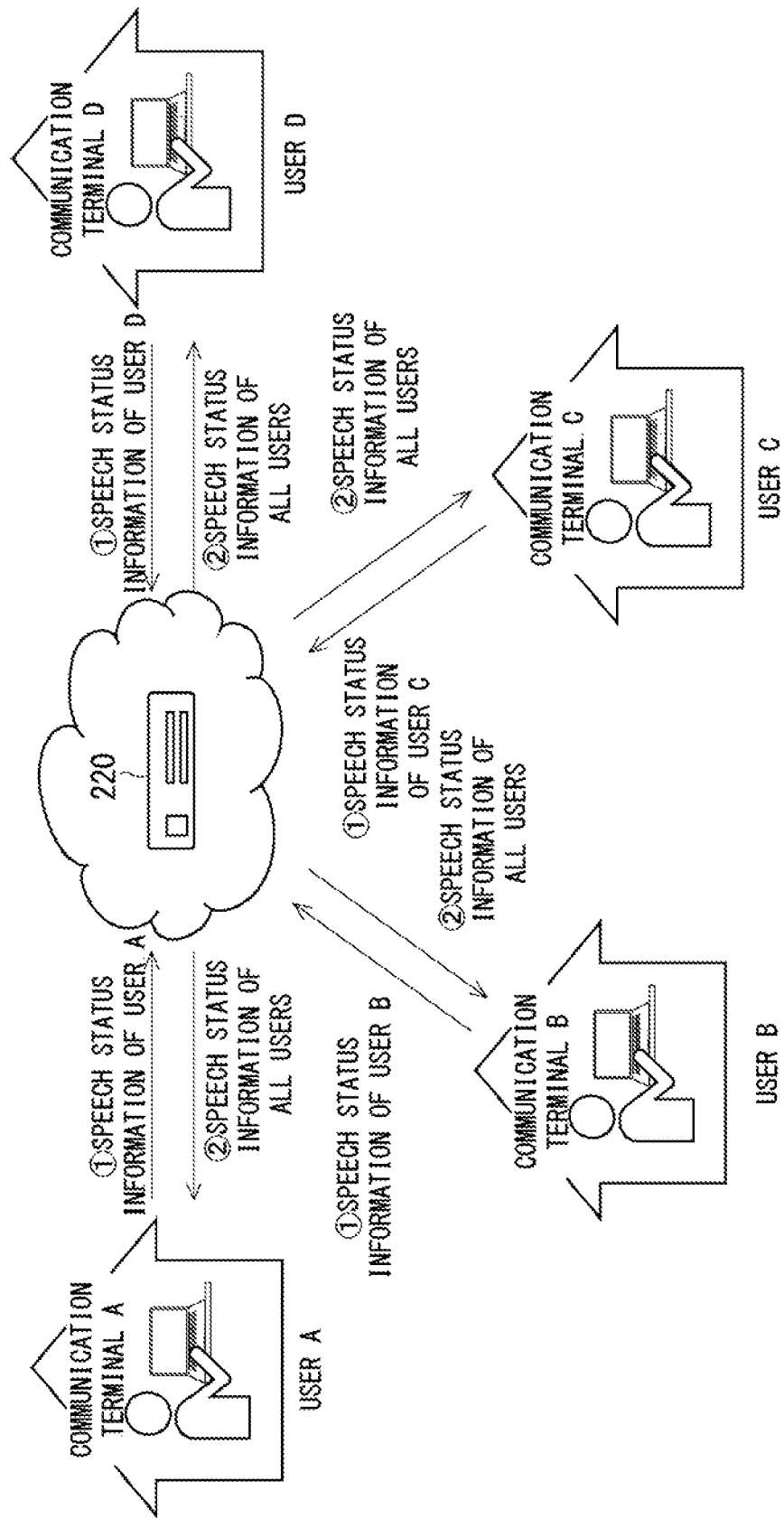
FIG. 9 is a diagram illustrating a state in which speech status information is transmitted and received in the teleconference system according to the second example embodiment.

FIG. 9 is a diagram illustrating a state in which speech status information is transmitted and received in the teleconference system 200 according to the second example embodiment. The communication terminal 201A (communication terminal A) transmits the speech status information of user A of the communication terminal 201A to the conference server 220. The communication terminal 201B (communication terminal B) transmits the speech status information of user B of the communication terminal 201B to the conference server 220. The communication terminal 201C (communication terminal C) transmits the speech status information of user C of the communication terminal 201C to the conference server 220. The communication terminal 201D (communication terminal D) transmits the speech status information of user D of the communication terminal 201D to the conference server 220.

The communication terminal 201A receives the speech status information of all the users (users A-D) from the conference server 220. Similarly, communication terminals 201B to 201D receive the speech status information of all the users (users A-D) from the conference server 220. Each communication terminal 201 may receive the speech status information of all but its user from the conference server 220. For example, the communication terminal 201A may receive the speech status information of users B-D from the conference server 220.

Figure 10:
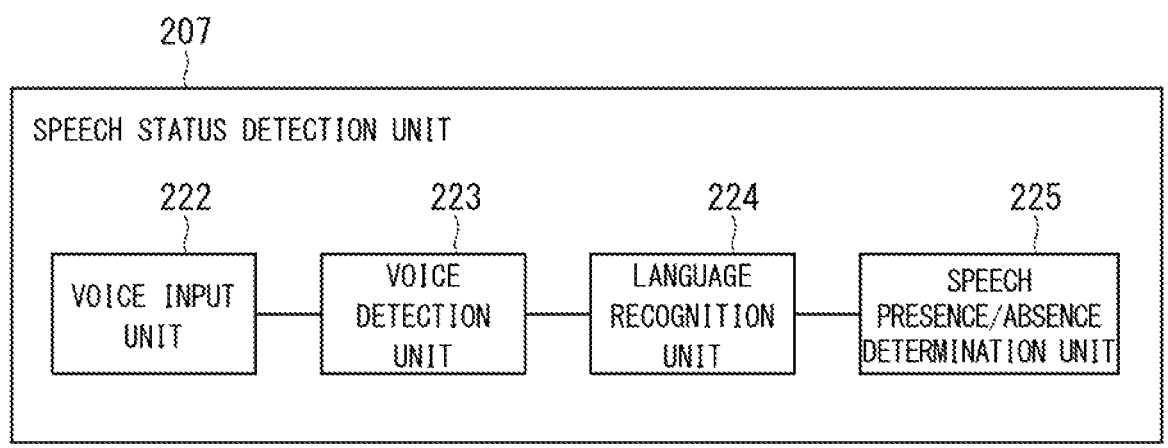
FIG. 10 is a block diagram showing a configuration of a speech status detection unit according to the second example embodiment.

FIG. 10 is a block diagram showing a configuration of the speech status detection unit 207 according to the second example embodiment. The speech status detection unit 207 corresponds to the speech determination unit 2 shown in FIG. 1 and the speech determination unit 120 shown in FIG. 5. That is, the speech status detection unit 207 includes a function as speech determination means. The speech status detection unit 207 includes a voice input unit 222, a voice detection unit 223, a language recognition unit 224, and a speech presence/absence determination unit 225.

The voice input unit 222 receives the voice signal (voice signal of the user of the communication terminal 201) collected by the microphone 204. The voice detection unit 223 detects voice information from the voice signal. The language recognition unit 224 performs voice recognition processing, acoustic analysis, natural language processing and the like to recognize meaningful language (subject, predicate, object, and the like) from the voice information.

The speech presence/absence determination unit 225 determines whether the voice information corresponds to speech or to back-slapping. When a language (a meaningful word) is recognized from the voice information, the speech presence/absence determination unit 225 determines that the voice information corresponds to speech. When a language is not recognized from the voice information, the speech presence/absence determination unit 225 determines that the voice information corresponds to back-channel. When a human voice is not recognized from the voice information, the speech presence/absence determination unit 225 may determine that the voice information corresponds to "mute" (a state in which neither speech nor back-channel is performed). The speech status detection unit 207 generates speech status information according to the determination result by the speech presence/absence determination unit 225. The speech status information may be generated by the conference control unit 209.

The conference information reception unit 208 and the conference information transmission unit 210 are connected to the conference server 220 via a network. The conference information reception unit 208 receives conference information of users of communication terminals 201A to 201D from the conference server 220. The conference information transmission unit 210 transmits conference information of the user of the communication terminal 201 to the conference server 220. For example, the communication terminal 201A transmits conference information of user A to the conference server 220.

Figure 11:
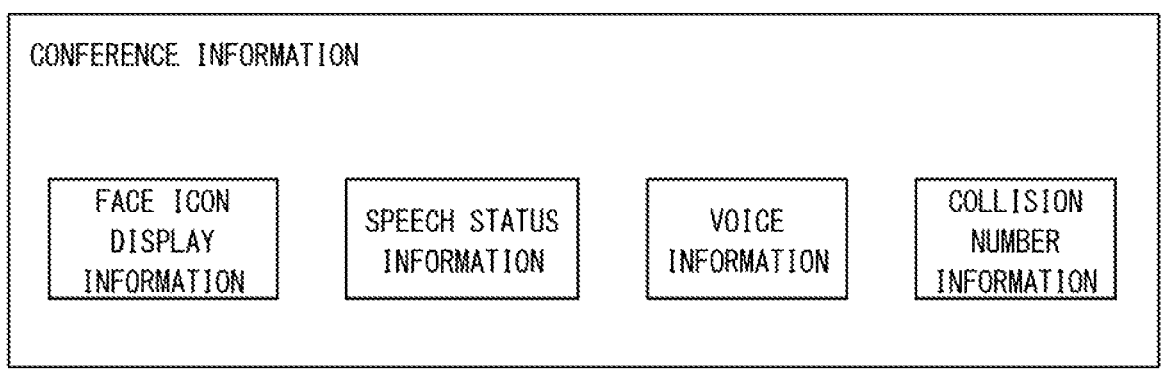
FIG. 11 is a diagram illustrating conference information according to the second example embodiment.

FIG. 11 is a diagram illustrating conference information according to the second example embodiment. The conference information includes face icon display information, speech status information, voice information, and collision number information. Further, the conference information may include identification information of the corresponding user (communication terminal 201). The face icon display information is information indicating how to display the face icon of the corresponding user. The collision number information is information indicating the number of collisions of the corresponding user. Note that the conference information transmitted by the conference information transmission unit 210 does not necessarily include all of the information shown in FIG. 11. Also, the conference information received by the conference information reception unit 208 does not necessarily include all of the information shown in FIG. 11.

The conference control unit 209 generates conference information to be transmitted by the conference information transmission unit 210. In other words, the conference control unit 209 determines which of the information illustrated in FIG. 11 is transmitted as conference information. The conference control unit 209 generates the conference information to be transmitted by the conference information transmission unit 210, using the conference information received by the conference information reception unit 208. The conference control unit 209 causes the display 205 to display images of the conference, using the conference information received by the conference information reception unit 208. The conference control unit 209 causes the speaker 206 to output voice, using the conference information received by the conference information reception unit 208.

Figure 12:
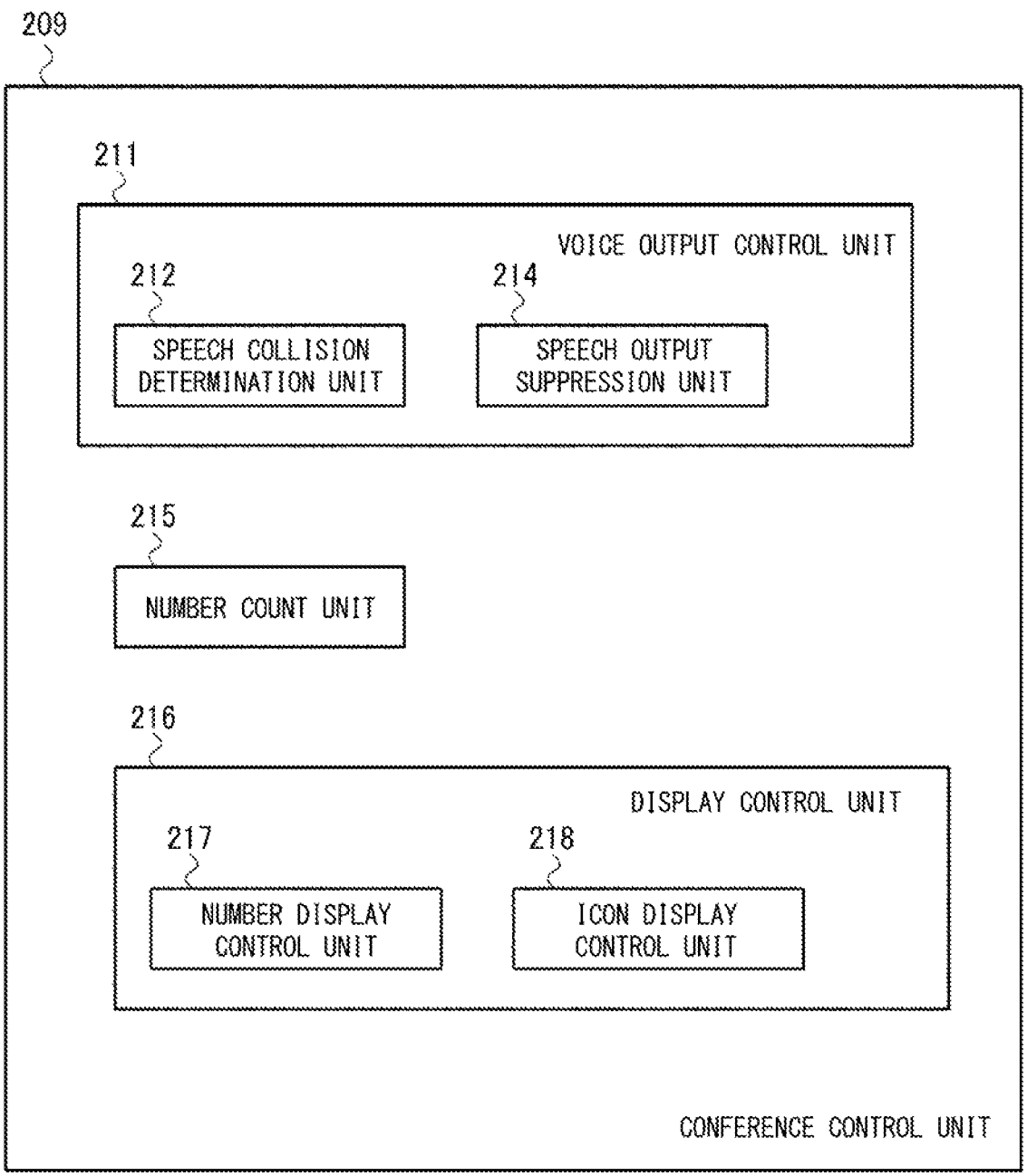
FIG. 12 is a diagram showing the configuration of a conference control unit according to the second example embodiment.

FIG. 12 is a diagram showing the configuration of the conference control unit 209 according to the second example embodiment. The conference control unit 209 includes a voice output control unit 211, a number count unit 215, and a display control unit 216. The voice output control unit 211 includes a speech collision determination unit 212, and a speech output suppression unit 214. The display control unit 216 includes a number display control unit 217, and an icon display control unit 218. The conference control unit 209 may be configured to perform the processing for each participant by the teleconference apparatus 100 according to the first example embodiment, only for the user of the corresponding communication terminal 201.

The voice output control unit 211 corresponds to the voice output control unit 4 shown in FIG. 1 and the voice output control unit 130 shown in FIG. 5. The voice output control unit 211 includes a function as voice output control means. The speech collision determination unit 212 corresponds to the speech collision determination unit 132 shown in FIG. 5. The speech collision determination unit 212 includes a function as speech collision determination means. The speech output suppression unit 214 corresponds to the speech output suppression unit 134 shown in FIG. 5. The speech output suppression unit 214 includes a function as speech output suppression means. The number count unit 215 corresponds to the count unit 6 shown in FIG. 1 and the number count unit 140 shown in FIG. 5. The number count unit 215 includes a function as counting means. The display control unit 216 corresponds to the display control unit 150 shown in FIG. 5. The display control unit 216 includes a function as display control means. The number display control unit 217 corresponds to the number display control unit 8 shown in FIG. 1 and the number display control unit 152 shown in FIG. 5. The number display control unit 217 includes a function as number display control means. The icon display control unit 218 corresponds to the icon display control unit 154 shown in FIG. 5. The icon display control unit 218 includes a function as icon display control means.

The voice output control unit 211 performs control so that the voice of each of a plurality of the participants in the teleconference is output by the corresponding communication terminal 201. The voice output control unit 211 performs control so that the voice of the user of the corresponding communication terminal 201 is output by the communication terminal 201 (first communication terminal) of each of a plurality of the participants. For example, in the communication terminal 201A, the voice output control unit 211 performs control so that the voice of user A is output by the communication terminal 201 of each of a plurality of the participants. The voice output control unit 211 may include a function substantially similar to that of the voice output control unit 130.

The speech collision determination unit 212 determines whether or not a speech collision has occurred for the user of the corresponding communication terminal 201. For example, in the communication terminal 201A, the speech collision determination unit 212 determines whether or not a speech collision has occurred due to the speech of user A. The speech collision determination unit 212 uses conference information about another user received by the conference information reception unit 208 to determine whether or not the speech of user A has not been made during the period of the speech of the other user. The speech collision determination unit 212 may include a function substantially similar to that of the speech collision determination unit 132.

When the user of the corresponding communication terminal 201 causes a collision speech, the speech output suppression unit 214 performs control to suppress the output of the collision speech in the communication terminal 201 (first communication terminal) of each of a plurality of the participants. For example, in the communication terminal 201A, the speech output suppression unit 214 performs control to suppress the output of the collision speech in the communication terminal 201 (first communication terminal) of each of a plurality of the participants when user A causes the collision speech. The speech output suppression unit 214 may include a function substantially similar to that of the speech output suppression unit 134.

The number count unit 215 counts the number of times the speech collision has occurred for the user of the corresponding communication terminal 201. For example, in the communication terminal 201A, the number count unit 215 counts the number of times the speech collision has occurred for user A. The number count unit 215 may include a function substantially similar to that of the number count unit 140.

The display control unit 216 controls, for the user of the corresponding communication terminal 201, what kind of image is displayed in the communication terminal 201 (first communication terminal) of each of a plurality of the participants. For example, in the communication terminal 201A, the display control unit 216 controls what kind of image for the user A is displayed in the communication terminal 201 (first communication terminal) of each of a plurality of the participants. The display control unit 216 may include a function substantially similar to that of the display control unit 150.

The number display control unit 217 performs control so that the number of collision speeches of the user of the corresponding communication terminal 201 is displayed by the communication terminal 201 (first communication terminal) of each of a plurality of the participants. For example, in the communication terminal 201A, the number display control unit 217 performs control so that the number of collision speeches of user A is displayed by the communication terminal 201 (first communication terminal) of each of a plurality of the participants. The number display control unit 217 may include a function substantially similar to that of the number display control unit 152.

The icon display control unit 218 performs control so that the face icon corresponding to the user of the corresponding communication terminal 201 is displayed on the communication terminal 201 (first communication terminal) of each of a plurality of the participants. For example, in the communication terminal 201A, the icon display control unit 218 performs control so that the face icon corresponding to user A is displayed on the communication terminal 201 (first communication terminal) of each of a plurality of the participants. The icon display control unit 218 may include a function substantially similar to that of the icon display control unit 154.

Figure 13:
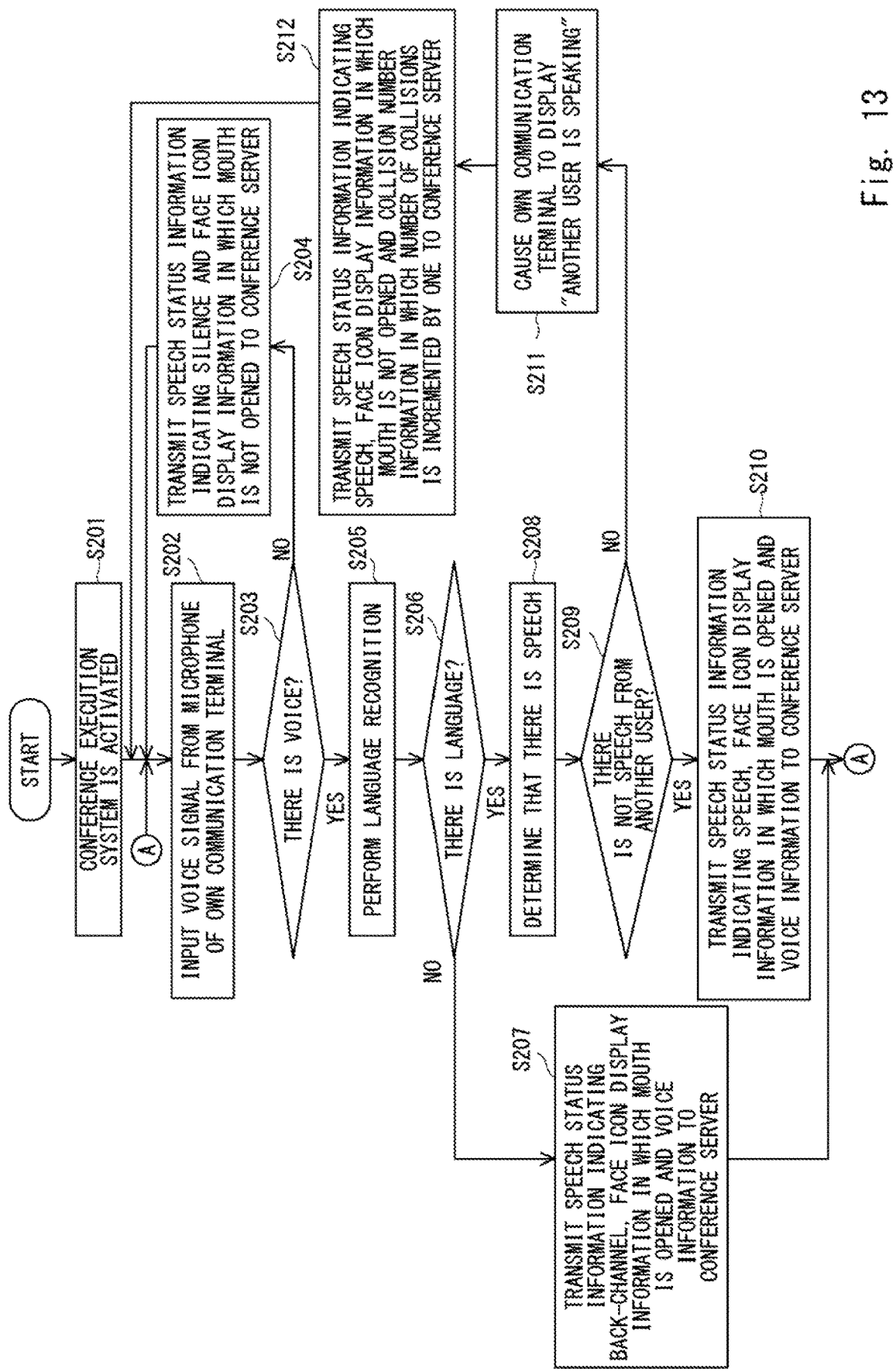
FIG. 13 is a flowchart showing a teleconference method executed by the teleconference system according to the second example embodiment.

FIG. 13 is a flowchart showing a teleconference method executed by the teleconference system 200 according to the second example embodiment. The teleconference method according to FIG. 13 is mainly executed by the conference execution system 202 of each communication terminal 201. In the following description, the processing of the communication terminal 201A will be described as appropriate, but the same will apply to other communication terminals 201.

First, the conference execution system 202 is activated (Step S201). At this time, the number of collisions for all participants in the teleconference is zero times. Further, the face icons of all participants in the teleconference have a state in which their mouths are closed. Then, the speech status detection unit 207 (voice input unit 222) inputs a voice signal from the microphone 204 of the communication terminal 201A (Step S202). The voice detection unit 223 determines whether there is speech of user A (Step S203).

When it is determined that there is no voice for user A (NO in S203), the conference control unit 209 generates conference information for user A corresponding to this determination and transmits it to the conference server 220 (Step S204). Then, the processing flow returns to S202. Specifically, the conference control unit 209 generates conference information including speech status information indicating silence and face icon display information indicating a face icon in which a mouth is not opened, and transmits the conference information to the conference server 220. The conference server 220 transmits this conference information to the communication terminals 201A to 201D. As a result, the face icon of user A in which the mouth is not opened is displayed on the display 205 of each communication terminal 201. Since no voice information is included in the conference information, the voice of user A is not output by the speaker 206 of each communication terminal 201. Examples of face icons will be described later.

In the processing of S204, the speech status detection unit 207 generates speech status information indicating silence. The icon display control unit 218 of the display control unit 216 generates face icon display information indicating a face icon in which a mouth is not opened. The voice output control unit 211 determines that the voice information is not to be included in the conference information. The conference information may include collision number information indicating that the number of collisions is zero times. In this case, the number display control unit 217 may generate collision number information indicating that the number of collisions is not increased.

On the other hand, when it is determined that there is a voice of user A (YES in S203), the language recognition unit 224 performs the aforementioned language recognition (Step S205). Then, the speech presence/absence determination unit 225 determines whether there is a language in the voice information (Step S206). That is, the speech presence/absence determination unit 225 determines whether the language is recognized from the voice information. If there is no language (NO in S206), the speech presence/absence determination unit 225 determines that the voice information of user A corresponds to the back-channel.

Then, the conference control unit 209 generates conference information of user A corresponding to this determination and transmits it to the conference server 220 (Step S207). Then, the processing flow returns to S202. Specifically, the conference control unit 209 generates conference information including speech status information indicating back-channel, face icon display information indicating a face icon in which a mouth is opened, and voice information, and transmits the conference information to the conference server 220. The conference server 220 transmits this conference information to the communication terminals 201A to 201D. As a result, the face icon of user A in which the mouth is opened is displayed on the display 205 of each communication terminal 201. Further, the voice (back-channel) of user A is output by the speaker 206 of each communication terminal 201.

In the processing of S207, the speech status detection unit 207 generates speech status information indicating back-channel. Further, the icon display control unit 218 of the display control unit 216 generates face icon display information indicating a face icon in which a mouth is opened. The voice output control unit 211 determines that the voice information is to be included in the conference information. The conference information may include collision number information indicating that the number of collisions has not increased. In this case, the number display control unit 217 may generate collision number information indicating that the number of collisions has not increased.

On the other hand, if there is a language (YES in S206), the speech presence/absence determination unit 225 determines that there is a speech in the voice information of user A (Step S208). In this case, the speech collision determination unit 212 of the conference control unit 209 determines whether there is not a speech from another user (Step S209). In other words, the speech collision determination unit 212 uses the received conference information (voice information and speech status information) of the other user to determine whether the other user has not made a speech before the speech of user A. In other words, the speech collision determination unit 212 determines whether the speech collision has not occurred due to the speech of user A.

When it is determined that there is not a speech from another user (YES in S209), the conference control unit 209 determines that the speech of user A has not caused the speech collision. Then, the conference control unit 209 generates conference information of user A corresponding to this determination and transmits it to the conference server 220 (Step S210). The processing flow then returns to S202. Specifically, the conference control unit 209 generates conference information including speech status information indicating speech, face icon display information indicating a face icon in which a mouth is opened, and voice information, and transmits the conference information to the conference server 220. The conference server 220 transmits this conference information to the communication terminals 201A to 201D. As a result, the face icon of user A in which the mouth is opened is displayed on the display 205 of each communication terminal 201. Further, the voice (speech) of user A is output by the speaker 206 of each communication terminal 201. In this case, the conference information may include display information indicating that user A is speaking. In this case, a message indicating that user A is speaking is displayed on the display 205 of each communication terminal 201. Accordingly, since each user can know who is speaking, it is easy for he or she to create conference minutes.

In the process of S210, the speech status detection unit 207 generates speech status information indicating speech. Further, the icon display control unit 218 of the display control unit 216 generates face icon display information indicating a face icon in which a mouth is opened. The voice output control unit 211 determines that the voice information is to be included in the conference information. The conference information may include collision number information indicating that the number of collisions has not increased. In this case, the number display control unit 217 may generate collision number information indicating that the number of collisions has not increased.

On the other hand, when it is determined that there is a speech from another user (NO in S209), the conference control unit 209 determines that the speech of user A has caused the speech collision. Then, the conference control unit 209 causes the display 205 of the communication terminal 201A to display a message such as "another user is speaking" (Step S211). Then, the conference control unit 209 generates conference information of user A corresponding to this determination and transmits it to the conference server 220 (Step S212). Then, the processing flow returns to S202. Specifically, the conference control unit 209 generates conference information including speech status information indicating speech (collision speech), face icon display information indicating a face icon in which a mouth is not opened, and collision number information in which the number of collisions is incremented by 1, and transmits the conference information to the conference server 220. The conference server 220 transmits this conference information to the communication terminals 201A to 201D. As a result, the face icon of user A in which the mouth is not opened is displayed on the display 205 of each communication terminal 201. Further, the number of collisions of user A, which is increased by 1, is displayed on the display 205 of each communication terminal 201. Since no voice information is included in the conference information, the voice of user A is not output by the speaker 206 of each communication terminal 201.

In the process of S212, the speech status detection unit 207 generates speech status information indicating speech (collision speech). Further, the icon display control unit 218 of the display control unit 216 generates face icon display information indicating a face icon in which a mouth is not opened. In addition, the speech output suppression unit 214 of the voice output control unit 211 determines that the voice information is not to be included in the conference information. The number display control unit 217 generates collision number information indicating that the number of collisions has increased by 1.

Figure 14:
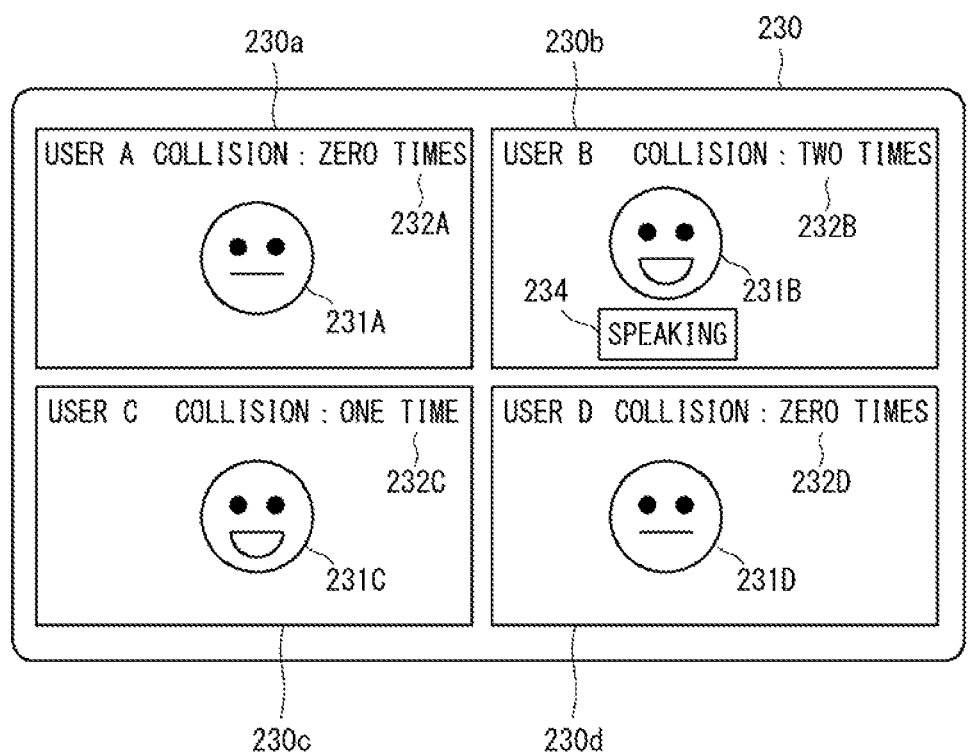
FIG. 14 is a diagram illustrating a conference image displayed in each communication terminal in the teleconference according to the second example embodiment.
Figure 15:
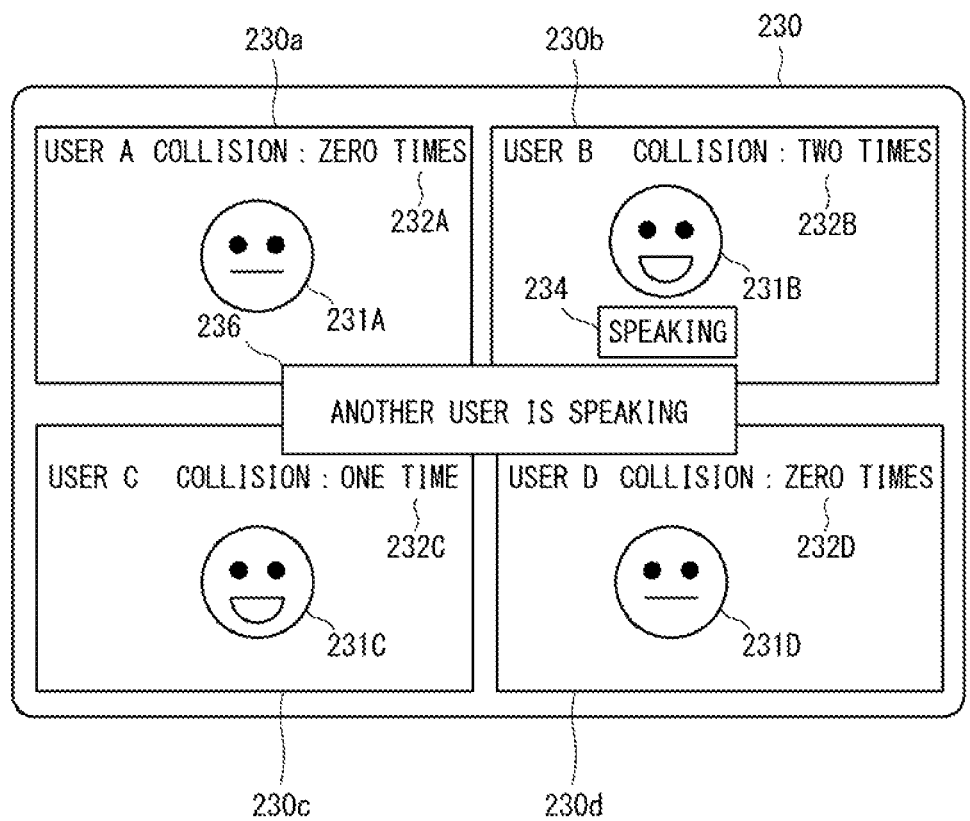
FIG. 15 is a diagram illustrating the conference image displayed in each communication terminal in the teleconference according to the second example embodiment.

FIGS. 14 and 15 are diagrams illustrating a conference image 230 displayed in each communication terminal 201 in the teleconference according to the second example embodiment. In the conference image 230, a face icon 231 corresponding to each user and the number of collisions 232 are displayed near a user name of each user. Therefore, a face icon 231A and the number of collisions 232A are displayed near the user name of user A. Similarly, a face icon 231B and the number of collisions 232B are displayed near the user name of user B. A face icon 231C and the number of collisions 232C are displayed near the user name of user C. A face icon 231D and the number of collisions 232D are displayed near the user name of user D. In the example of FIG. 14, the number of collisions 232A indicates zero times, the number of collisions 232B indicates two times, the number of collisions 232C indicates one time, and the number of collisions 232D indicates zero times. The conference image 230 may include a display area 230*a* to 230*d* in which a face icon 231 and the number of collisions 232 are displayed for each user A to D.

In the conference image 230 illustrated in FIG. 14, the user B is speaking. Therefore, a message 234 indicating that user B is speaking is displayed near the face icon 231B of user B. Further, a mouth of the face icon 231B of user B is opened. Further, user C is making back-channel. Therefore, a mouth of the face icon 231C of user C is opened. Further, users A and D are silent. Therefore, a mouth of the face icon 231A of user A and a mouth of the face icon 231D of user D are closed. Further, since user B is speaking, each communication terminal 201 outputs the speech of user B. Since user C is making back-channel, each communication terminal 201 outputs the back-channel of user C.

FIG. 15 illustrates a case in which a speech collision occurs due to the speech of user A in the state of the conference image 230 illustrated in FIG. 14. If user A makes a speech later than user B when user B is making a speech, a speech of user A is determined as a collision speech. In this case, a message 236 indicating that another user (user B) is making a speech is displayed on the communication terminal 201A of user A. Further, the number of collisions 232A of user A is updated from zero to one. Since the speech of user A is the collision speech, the mouth of the face icon 231A of user A is closed. Note that the message 236 is displayed only on the communication terminal 201A of user A, but the conference image 230 displayed on communication terminal 201 of each user can be the same as one another, other than message 236.

Advantageous Effects of this Example Embodiment

The advantageous effects of this example embodiment will be described below.

In recent years, opportunities to hold the teleconference while participants stay at home have increased. When teleconferences are held, the utilization of teleconference using the home Internet environment has increased. In this case, since the delay occurs due to the home Internet environment, there is a possibility that it is likely to occur a case in which the speeches of a plurality of participants will overlap with one another (speech collision) and a case that they will refrain from speaking, and the teleconference may not proceed smoothly. In addition, when participants participate in the teleconference at home, the participants often participate in the teleconference only by voice, for reasons such as privacy concerns and preventing congestion of Internet lines. In this case, there is a problem of not being able to read the facial expressions of another person during a conversation. Further, there is a problem of not being able to communicate back-channel of participants to the speaker because he or she performs mute setting to prevent environmental sounds from entering when he or she is not speaking. Further, in a technique of employ a system to show a display indicating speaking for participants who have voice information, there is a problem that it is difficult to understand who is speaking when there are many participants in a conference, because the voice information is considered to be speaking even if it indicates only back-channel.

The teleconference system according to the present example embodiment is configured so that, when one participant is speaking and another participant makes speech later, the output of the speech of the other participant who has made speech later is suppressed in the communication terminal of each participant. Accordingly, hearing of the collision speech (the speech of the other participant who has made speech later) by each participant using the communication terminal is suppressed, and thereby the progress of the teleconference becomes smooth.

Furthermore, the teleconference system according to the present example embodiment is configured so as to count the number of collisions for each participant who has caused a speech collision and to cause the display about the number of collisions to be output at each communication terminal. Thus, each participant can know which participant makes many speech collisions and so on. Accordingly, each of the participants can receive awareness of which participant wants to speak. As a result, the other participant can perform an act, such as encouraging the participant to make speech or waiting for the participant to make speech. Therefore, the teleconference system according to the present example embodiment can smoothly progress the teleconference.

In addition, the teleconference system according to the present example embodiment is configured so that the number of collisions is displayed by the communication terminal of each participant for each of a plurality of the participants. Accordingly, each participant can know the number of collisions of each of the participants.

Further, the teleconference system according to the present example embodiment is configured to cause the communication terminal of the participant who has made speech late to display a message such as "another user is speaking". Therefore, the participant who has caused the collision speech can receive awareness that the speech collision has occurred.

Moreover, the teleconference system according to the present example embodiment is configured, even when one participant is making speech and another participant makes back-channel, so as to cause the communication terminal of each participant to output the back-channel. Thus, the participant (speaker) who is making the speech can get a reassurance that the other participant is hearing the speech.

In addition, the teleconference system according to the present example embodiment is configured, when a certain participant makes back-channel, so as to cause the communication terminal of each participant to display an open-mouthed face icon corresponding to the participant who makes the back-channel. Thus, even if the communication terminal of the participant who has made the back-channel is set to mute, the speaker can know that there is a participant who is making the back-talk, and thereby the speaker can get a reassurance that the other participant is hearing the speech.

Further, the teleconference system according to the second example embodiment is configured so that, when a speech collision occurs, the speech information of the collision speech is not transmitted from the communication terminal to the conference server. Accordingly, it is possible to reduce the load on the network.

MODIFIED EXAMPLES

Note that the present invention is not limited to the aforementioned example embodiments and may be changed as appropriate within the scope of the present invention. For example, a plurality of the above-described example embodiments are mutually applicable. For example, the function of the teleconference apparatus 100 according to the first example embodiment may be implemented by the communication terminal 201 according to the second example embodiment. Further, the function of the communication terminal 201 according to the second example embodiment may be implemented by the teleconference apparatus 100 according to the first example embodiment.

Furthermore, in each of the above-described flowcharts, an order of each piece of processing (step) is suitably changeable. Moreover, one or more of a plurality of pieces of processing (steps) may be omitted. For example, in FIG. 7, the order of S170 and S180 may be reversed. Similarly, in FIG. 13, the order of S211 and S212 may be reversed. In addition, in FIG. 7, the processing of S114, S124 and S138 may be absent. Similarly, the processing of S211 may be absent.

Furthermore, although the number display control unit performs control so that the number of collisions of each participant (user) is displayed on the communication terminals of a plurality of the participants in each of the above-described example embodiments, such a configuration is not a limitation. The number display control unit need not cause a plurality of the communication terminals to display the number of collisions itself. For example, the number display control unit may cause a plurality of the communication terminals to display a level corresponding to the number of collisions. For example, the number display control unit may cause each communication terminal to output a display such as level C if the number of collisions is two or less times, level B if the number of collisions is three to four times, and level A if the number of collisions is five or more times. Further, the number display control unit may cause each communication terminal to display a warning when the number of collisions of a certain participant exceeds a threshold. For example, the number display control unit may cause each communication terminal to display the face icon of a participant whose number of collisions has increased in such a way that the face icon is activated in a form in which it is possible to knows that he/she wants to speak (the color of the face icon turns red, for example).

Further, the number of collisions may continue to increase every time the speech collision occurs while the teleconference is running, or may be reset in the middle of the teleconference. For example, the number of collisions may be reset when the corresponding participant makes a predetermined number of non-collision speeches. For example, the number of collisions may be reset when the corresponding participant operates the communication terminal.

In the second example embodiment, each communication terminal 201 generates the face icon display information of the corresponding user, but such a configuration is not a limitation. For example, each communication terminal 201 may generate the face icon of user A using the speech status information about user A transmitted from the communication terminal 201A.

In the above-described example embodiment, the face icon of each user (participant) is displayed on each of a plurality of the communication terminals during the teleconference, but such a configuration is not a limitation. The face image of each user shot by the camera 203 or the like may be displayed on each of a plurality of the communication terminals. However, when the face image of the user is displayed, both the mouth of the user who is making the back-channel and the mouth of the user who is causing the collision speech may be moving in the image. Therefore, other users may not be able to visually distinguish between the back-channel and the collision speech. On the other hand, in present example embodiment, a face icon is displayed on each communication terminal a face icon is displayed at each communication terminal so that the mouth of the face icon of the user who causes collision speech is closed and the mouth of the face icon of the user who makes the back-channel is opened. Therefore, in the present example embodiment, it is possible to visually distinguish between the back-channel and the collision speech. Furthermore, in the teleconference system according to the present example embodiment, since each communication terminal does not transmit video information, it is possible to know the speech status of the user while reducing the load on the network. In the aforementioned examples, the program can be stored using any type of non-transitory computer readable medium and provided to the computer. The non-transitory computer readable media include various types of tangible storage media. Examples of the non-transitory computer readable medium include a magnetic storage medium (such as a flexible disk, a magnetic tape, and a hard disk drive), an optical magnetic storage medium (such as a magneto-optical disk), a CD-ROM (Read Only Memory), a CD-R, a CD-R/W, and a semiconductor memory (such as a mask ROM, a PROM (Programmable ROM), an EPROM (Erasable PROM), a flash ROM, and a RAM (Random Access Memory)). The program may be provided to a computer using various types of transitory computer readable media. Examples of the transitory computer readable medium include an electric signal, an optical signal, and an electromagnetic wave. The transitory computer readable medium can supply the program to a computer via a wired communication line, such as an electric wire and an optical fiber, or a wireless communication line.

The whole or part of the above example embodiments can be described as, but not limited to, the following supplementary notes.

(Supplementary Note 1)

A teleconference system comprising:
  speech determination means for determining whether a voice of each of a plurality of participants in a teleconference indicates speech or back-channel;
  voice output control means for performing control so that the voice of each of a plurality of the participants is output by a communication terminal of each of a plurality of the participants, and performing control, when, while one of a plurality of the participants makes speech, another participant makes speech, so as to suppress an output of the speech of the another participant;
  count means for counting a number of first speeches in which their outputs are suppressed, for each participant; and
  number display control means for performing control so that a display related to the number of times is made at the communication terminals of a plurality of the participants.

(Supplementary Note 2)

The teleconference system according to Supplementary note 1, wherein
  the number display control means performs control so that the number of the first speeches for each of a plurality of the participants is displayed on the communication terminal of each of a plurality of the participants.

(Supplementary Note 3)

The teleconference system according to Supplementary note 2, wherein
  the number display control means causes the communication terminal to display the number greater than a predetermined threshold in a display form that is more conspicuous than a display of the number equal to or less than the threshold.

(Supplementary Note 4)

The teleconference system according to Supplementary note 2, wherein
  the number display control means causes the communication terminal to display the greatest number among the number of a plurality of the participants in a display form that is more conspicuous than a display of other number.

(Supplementary Note 5)

The teleconference system according to any one of Supplementary notes 1 to 4, wherein
the voice output control means performs control so that, when the participant makes back-channel, the back-channel is output at the communication terminal of each of a plurality of the participants.

(Supplementary Note 6)

The teleconference system according to any one of Supplementary notes 1 to 5, further comprising icon display control means for performing control so that face icons corresponding to a plurality of the participants respectively are displayed on the communication terminal of each of a plurality of the participants, wherein
the icon display control means displays the face icon so that the face icon corresponding to the other participant who has made the first speech is not moved, and displays the face icon so that the face icon corresponding to the participant who has made speech other than the first speech is moved.

(Supplementary Note 7)

The teleconference system according to Supplementary note 6, wherein
the icon display control means displays the face icon so that, when the participant has made back-channel, the face icon corresponding to the participant is moved.

(Supplementary Note 8)

A communication terminal comprising:
speech determination means for determining whether a voice of a user of the communication terminal indicates speech or back-channel in a teleconference in which the user participates;
voice output control means for performing control so that a voice of each of a plurality of participants in the teleconference is output by the communication terminal and the voice of the user is output by a first communication terminal which is a communication terminal of each of a plurality of the participants, and performing control, when, while one of a plurality of the participants makes speech, the user makes speech, so as to suppress an output of the speech of the user at the first communication terminal;
count means for counting a number of first speeches in which their outputs are suppressed, for the user; and
number display control means for performing control so that a display related to the number of times is made at the first communication terminal.

(Supplementary Note 9)

The communication terminal according to Supplementary note 8, wherein
the number display control means performs control so that the number of the first speeches of the user of the communication terminal is displayed on the first communication terminal.

(Supplementary Note 10)

The communication terminal according to Supplementary note 8 or 9, wherein
the voice output control means performs control so that, when the user of the communication terminal makes back-channel, the back-channel is output at the first communication terminal.

(Supplementary Note 11)

The communication terminal according to any one of Supplementary notes 8 to 10, further comprising icon display control means for performing control so that a face icon corresponding to the user of the communication terminal is displayed on the first communication terminal, wherein
the icon display control means displays the face icon so that the face icon is not moved when the user of the communication terminal has made the first speech, and displays the face icon so that the face icon is moved when the user of the communication terminal has made speech other than the first speech.

(Supplementary Note 12)

The communication terminal according to Supplementary note 11, wherein
the icon display control means displays the face icon so that the face icon is moved when the user of the communication terminal has made back-channel.

(Supplementary Note 13)

A teleconference method comprising:
determining whether a voice of each of a plurality of participants in a teleconference indicates speech or back-channel;
performing control so that the voice of each of a plurality of the participants is output by a communication terminal of each of a plurality of the participants;
performing control, when, while one of a plurality of the participants makes speech, another participant makes speech, so as to suppress an output of the speech of the another participant;
counting a number of first speeches in which their outputs are suppressed, for each participant; and
performing control so that a display related to the number of times is made at the communication terminals of a plurality of the participants.

(Supplementary Note 14)

The teleconference method according to Supplementary note 13, comprising performing control so that the number of the first speeches for each of a plurality of the participants is displayed on the communication terminal of each of a plurality of the participants.

(Supplementary Note 15)

The teleconference method according to Supplementary note 14, comprising causing the communication terminal to display the number greater than a predetermined threshold in a display form that is more conspicuous than a display of the number equal to or less than the threshold.

(Supplementary Note 16)

The teleconference method according to Supplementary note 14, comprising causing the communication terminal to display the greatest number among the number of a plurality of the participants in a display form that is more conspicuous than a display of other number.

(Supplementary Note 17)

The teleconference method according to any one of Supplementary notes 13 to 16, comprising performing control so that, when the participant makes back-channel, the back-channel is output at the communication terminal of each of a plurality of the participants.

(Supplementary Note 18)

The teleconference method according to any one of Supplementary notes 13 to 17, comprising:
performing control so that face icons corresponding to a plurality of the participants respectively are displayed on the communication terminal of each of a plurality of the participants;
displaying the face icon so that the face icon corresponding to the other participant who has made the first speech is not moved; and
displaying the face icon so that the face icon corresponding to the participant who has made speech other than the first speech is moved.

(Supplementary Note 19)

The teleconference method according to Supplementary note 18, comprising displaying the face icon so that, when the participant has made back-channel, the face icon corresponding to the participant is moved.

(Supplementary Note 20)

A teleconference method executed by a communication terminal, comprising:
  determining whether a voice of a user of the communication terminal indicates speech or back-channel in a teleconference in which the user participates;
  performing control so that a voice of each of a plurality of participants in the teleconference is output by the communication terminal and the voice of the user is output by a first communication terminal which is a communication terminal of each of a plurality of the participants;
  performing control, when, while one of a plurality of the participants makes speech, the user makes speech, so as to suppress an output of the speech of the user at the first communication terminal;
  counting a number of first speeches in which their outputs are suppressed, for the user; and
  performing control so that a display related to the number of times is made at the first communication terminal.

(Supplementary Note 21)

The teleconference method according to Supplementary note 20, comprising performing control so that the number of the first speeches of the user of the communication terminal is displayed on the first communication terminal.

(Supplementary Note 22)

The teleconference method according to Supplementary note 20 or 21, comprising performing control so that, when the user of the communication terminal makes back-channel, the back-channel is output at the first communication terminal.

(Supplementary Note 23)

The teleconference method according to any one of Supplementary notes 20 to 22, comprising:
  performing control so that a face icon corresponding to the user of the communication terminal is displayed on the first communication terminal;
  displaying the face icon so that the face icon is not moved when the user of the communication terminal has made the first speech; and
  displaying the face icon so that the face icon is moved when the user of the communication terminal has made speech other than the first speech.

(Supplementary Note 24)

The teleconference method according to Supplementary note 23, comprising displaying the face icon so that the face icon is moved when the user of the communication terminal has made back-channel.

(Supplementary Note 25)

A program for causing a computer to achieve:
  a function of determining whether a voice of each of a plurality of participants in a teleconference indicates speech or back-channel;
  a function of performing control so that the voice of each of a plurality of the participants is output by a communication terminal of each of a plurality of the participants, and performing control, when, while one of a plurality of the participants makes speech, another participant makes speech, so as to suppress an output of the speech of the another participant;
  a function of counting a number of first speeches in which their outputs are suppressed, for each participant; and
  a function of performing control so that a display related to the number of times is made at the communication terminals of a plurality of the participants.

(Supplementary Note 26)

A program for executing a teleconference method executed by a communication terminal, the program causing a computer to achieve:
  a function of determining whether a voice of a user of the communication terminal indicates speech or back-channel in a teleconference in which the user participates;
  a function of performing control so that a voice of each of a plurality of participants in the teleconference is output by the communication terminal and the voice of the user is output by a first communication terminal which is a communication terminal of each of a plurality of the participants, and performing control, when, while one of a plurality of the participants makes speech, the user makes speech, so as to suppress an output of the speech of the user at the first communication terminal;
  a function of counting a number of first speeches in which their outputs are suppressed, for the user; and
  a function of performing control so that a display related to the number of times is made at the first communication terminal.

While the invention of the present application has been described above with reference to the example embodiments, the invention of the present application is not limited by the above description. Various changes that may be understood by a person skilled in the art can be made to a configuration and details of the invention of the present application within the scope of the invention.

This application is based upon and claims the benefit of priority from Japanese Patent Application No. 2020-205681, filed on Dec. 11, 2020, the disclosure of which is incorporated herein in its entirety by reference.

REFERENCE SIGNS LIST

1 TELECONFERENCE SYSTEM
2 SPEECH DETERMINATION UNIT
4 VOICE OUTPUT CONTROL UNIT
6 COUNT UNIT
8 NUMBER DISPLAY CONTROL UNIT
20 TELECONFERENCE SYSTEM
22 NETWORK
30 COMMUNICATION TERMINAL
42 VOICE ACQUISITION UNIT
44 VOICE TRANSMISSION UNIT
46 VOICE RECEPTION UNIT
48 VOICE OUTPUT UNIT
52 DISPLAY INFORMATION RECEPTION UNIT
54 IMAGE DISPLAY UNIT
100 TELECONFERENCE APPARATUS
110 PARTICIPANT INFORMATION STORAGE UNIT
112 VOICE RECEPTION UNIT
120 SPEECH DETERMINATION UNIT
130 VOICE OUTPUT CONTROL UNIT
132 SPEECH COLLISION DETERMINATION UNIT
134 SPEECH OUTPUT SUPPRESSION UNIT
140 NUMBER COUNT UNIT
150 DISPLAY CONTROL UNIT
152 NUMBER DISPLAY CONTROL UNIT
154 ICON DISPLAY CONTROL UNIT
200 TELECONFERENCE SYSTEM
201 COMMUNICATION TERMINAL
202 CONFERENCE EXECUTION SYSTEM

207 SPEECH STATUS DETECTION UNIT
208 CONFERENCE INFORMATION RECEPTION UNIT
209 CONFERENCE CONTROL UNIT
210 CONFERENCE INFORMATION TRANSMISSION UNIT
211 VOICE OUTPUT CONTROL UNIT
212 SPEECH COLLISION DETERMINATION UNIT
214 SPEECH OUTPUT SUPPRESSION UNIT
215 NUMBER COUNT UNIT
216 DISPLAY CONTROL UNIT
217 NUMBER DISPLAY CONTROL UNIT
218 ICON DISPLAY CONTROL UNIT
220 TELECONFERENCE SERVER
222 VOICE INPUT UNIT
223 VOICE DETECTION UNIT
224 LANGUAGE RECOGNITION UNIT
225 SPEECH PRESENCE/ABSENCE DETERMINATION UNIT

What is claimed is:

1. A teleconference system comprising:
hardware, including at least one processor and at least one memory;
speech determination unit implemented at least by the hardware and configured to determine whether a voice of each of a plurality of participants in a teleconference indicates speech or back-channel;
voice output control unit implemented at least by the hardware and configured to perform control so that the voice of each of a plurality of the participants is output by a communication terminal of each of a plurality of the participants, and perform control, when, while one of a plurality of the participants makes speech, another participant makes speech, so as to suppress an output of the speech of the another participant;
count unit implemented at least by the hardware and configured to count a number of first speeches in which their outputs are suppressed, for each participant, the number of the first speeches being a number of times that the first speeches have occurred for each of the participants; and
number display control unit implemented at least by the hardware and configured to perform control so that a display related to the number of the first speeches is made at the communication terminals of a plurality of the participants.

2. The teleconference system according to claim 1, wherein
the number display control unit performs control so that the number of the first speeches for each of a plurality of the participants is displayed on the communication terminal of each of a plurality of the participants.

3. The teleconference system according to claim 2, wherein
the number display control unit causes the communication terminal to display the number of the first speeches greater than a predetermined threshold in a display form that is more conspicuous than a display of the number of the first speeches equal to or less than the threshold.

4. The teleconference system according to claim 2, wherein
the number display control unit causes the communication terminal to display the greatest number of the first speeches among the number of the first speeches of a plurality of the participants in a display form that is more conspicuous than a display of other number of the first speeches.

5. The teleconference system according to claim 1, wherein
the voice output control unit performs control so that, when the participant makes back-channel, the back-channel is output at the communication terminal of each of a plurality of the participants.

6. The teleconference system according to claim 1, further comprising icon display control unit implemented at least by the hardware and configured to perform control so that a face icon corresponding to each of a plurality of the participants is displayed on the communication terminal of each of a plurality of the participants, wherein
the icon display control unit displays the face icon so that the face icon corresponding to the another participant who has made each of the first speeches is not moved, and displays the face icon so that the face icon corresponding to the participant who has made speech other than each of the first speeches is moved.

7. The teleconference system according to claim 6, wherein
the icon display control unit displays the face icon so that, when the participant has made back-channel, the face icon corresponding to the participant is moved.

8. A communication terminal comprising:
hardware, including at least one processor and at least one memory;
speech determination unit implemented at least by the hardware and configured to determine whether a voice of a user of the communication terminal indicates speech or back-channel in a teleconference in which the user participates;
voice output control unit implemented at least by the hardware and configured to perform control so that a voice of each of a plurality of participants in the teleconference is output by the communication terminal and the voice of the user is output by a first communication terminal which is a communication terminal of each of a plurality of the participants, and perform control, when, while one of a plurality of the participants makes speech, the user makes speech, so as to suppress an output of the speech of the user at the first communication terminal;
count unit implemented at least by the hardware and configured to count a number of first speeches in which their outputs are suppressed, for the user of the communication terminal, the number of the first speeches being a number of times that the first speeches have occurred for each of the participants; and
number display control unit implemented at least by the hardware and configured to perform control so that a display related to the number of the first speeches is made at the first communication terminal.

9. The communication terminal according to claim 8, wherein
the number display control unit performs control so that the number of the first speeches of the user of the communication terminal is displayed on the first communication terminal.

10. The communication terminal according to claim 8, wherein
the voice output control unit performs control so that, when the user of the communication terminal makes back-channel, the back-channel is output at the first communication terminal.

11. The communication terminal according to claim 8, further comprising icon display control unit implemented at least by the hardware and configured to perform control so that a face icon corresponding to the user of the communication terminal is displayed on the first communication terminal, wherein
the icon display control unit displays the face icon so that the face icon is not moved when the user of the communication terminal has made the first speech, and displays the face icon so that the face icon is moved when the user of the communication terminal has made speech other than the first speech.

12. The communication terminal according to claim 11, wherein
the icon display control unit displays the face icon so that the face icon is moved when the user of the communication terminal has made back-channel.

13. A teleconference method comprising:
determining whether a voice of each of a plurality of participants in a teleconference indicates speech or back-channel;
performing control so that the voice of each of a plurality of the participants is output by a communication terminal of each of a plurality of the participants;
performing control, when, while one of a plurality of the participants makes speech, another participant makes speech, so as to suppress an output of the speech of the another participant;
counting a number of first speeches in which their outputs are suppressed, for each participant, the number of the first speeches being a number of times that the first speeches have occurred for each of the participants; and
performing control so that a display related to the number of the first speeches is made at the communication terminals of a plurality of the participants.

14. The teleconference method according to claim 13, comprising performing control so that the number of the first speeches for each of a plurality of the participants is displayed on the communication terminal of each of a plurality of the participants.

15. The teleconference method according to claim 14, comprising causing the communication terminal to display the number of the first speeches greater than a predetermined threshold in a display form that is more conspicuous than a display of the number of the first speeches equal to or less than the threshold.

16. The teleconference method according to claim 14, comprising causing the communication terminal to display the greatest number of the first speeches among the number of the first speeches of a plurality of the participants in a display form that is more conspicuous than a display of other number of the first speeches.

17. The teleconference method according to claim 13, comprising performing control so that, when the participant makes back-channel, the back-channel is output at the communication terminal of each of a plurality of the participants.

18. The teleconference method according to claim 13, comprising:
performing control so that a face icon corresponding to each of a plurality of the participants is displayed on the communication terminal of each of a plurality of the participants;
displaying the face icon so that the face icon corresponding to the another participant who has made each of the first speeches is not moved; and
displaying the face icon so that the face icon corresponding to the participant who has made speech other than each of the first speeches is moved.

19. The teleconference method according to claim 18, comprising displaying the face icon so that, when the participant has made back-channel, the face icon corresponding to the participant is moved.

* * * * *